(12) United States Patent
Yamagishi et al.

(10) Patent No.: US 9,405,330 B2
(45) Date of Patent: Aug. 2, 2016

(54) TOUCH PANEL SUBSTRATE AND DISPLAY PANEL

(75) Inventors: Shinji Yamagishi, Osaka (JP); Yasuhiro Sugita, Osaka (JP); Yuhji Yashiro, Osaka (JP); Kazutoshi Kida, Osaka (JP); Hiroyuki Ogawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 136 days.

(21) Appl. No.: 14/235,172

(22) PCT Filed: Jul. 4, 2012

(86) PCT No.: PCT/JP2012/067136
§ 371 (c)(1),
(2), (4) Date: Jan. 27, 2014

(87) PCT Pub. No.: WO2013/018495
PCT Pub. Date: Feb. 7, 2013

(65) Prior Publication Data
US 2014/0160377 A1    Jun. 12, 2014

(30) Foreign Application Priority Data
Jul. 29, 2011   (JP) .................. 2011-167734

(51) Int. Cl.
*G06F 1/16*   (2006.01)
*G06F 3/044*   (2006.01)
(Continued)

(52) U.S. Cl.
CPC .......... *G06F 1/1692* (2013.01); *G02F 1/13338* (2013.01); *G06F 1/1643* (2013.01); *G06F 3/044* (2013.01); *G06F 3/0418* (2013.01); *G06F 2203/04107* (2013.01)

(58) Field of Classification Search
CPC ............................. G06F 1/1692; G06F 1/1643
USPC ............................................... 349/12
See application file for complete search history.

(56) References Cited

U.S. PATENT DOCUMENTS

| 5,527,649 A | 6/1996 | Sato et al. |
| 6,452,514 B1 | 9/2002 | Philipp |
| 2009/0185088 A1 | 7/2009 | Shinohara |

(Continued)

FOREIGN PATENT DOCUMENTS

| JP | 2010-72581 A | 4/2010 |
| JP | 2010-72584 A | 4/2010 |

(Continued)

OTHER PUBLICATIONS

Official Communication issued in International Patent Application No. PCT/JP2012/067136, mailed on Oct. 2, 2012.

(Continued)

*Primary Examiner* — Sang V Nguyen
(74) *Attorney, Agent, or Firm* — Keating & Bennett, LLP

(57) ABSTRACT

A touch panel substrate (5) provided with position detecting electrodes (first electrodes (12) and second electrodes (13)) includes a black matrix (17) which is made of an electrically conductive material and is electrically connected to a counter electrode (19). This provides (i) a touch panel substrate which is high in position detection performance and capable of carrying out a stable position detecting operation and which is used in an in-cell touch panel, and (ii) a display panel including such a touch panel substrate.

12 Claims, 33 Drawing Sheets

(51) Int. Cl.
*G02F 1/1333* (2006.01)
*G06F 3/041* (2006.01)

(56) References Cited

U.S. PATENT DOCUMENTS

| | | | | |
|---|---|---|---|---|
| 2009/0194344 | A1* | 8/2009 | Harley et al. | 178/18.06 |
| 2010/0136868 | A1* | 6/2010 | Chien et al. | 445/24 |
| 2010/0182273 | A1 | 7/2010 | Noguchi et al. | |
| 2010/0214247 | A1* | 8/2010 | Tang et al. | 345/173 |
| 2011/0057887 | A1* | 3/2011 | Lin | G06F 3/044 345/173 |
| 2011/0090445 | A1* | 4/2011 | Kim | G02F 1/1339 349/139 |
| 2011/0102361 | A1* | 5/2011 | Philipp | G06F 3/044 345/174 |
| 2011/0262631 | A1* | 10/2011 | Lee et al. | 427/123 |
| 2011/0310033 | A1* | 12/2011 | Liu et al. | 345/173 |
| 2012/0098781 | A1* | 4/2012 | Kim et al. | 345/174 |
| 2012/0127095 | A1* | 5/2012 | Jun | 345/173 |
| 2012/0182230 | A1* | 7/2012 | Wang et al. | 345/173 |
| 2013/0021285 | A1* | 1/2013 | Kimura | G02F 1/13338 345/173 |
| 2013/0021289 | A1* | 1/2013 | Chen et al. | 345/174 |
| 2014/0098307 | A1* | 4/2014 | Iwami | 349/12 |

FOREIGN PATENT DOCUMENTS

| | | |
|---|---|---|
| JP | 2010-160745 A | 7/2010 |
| TW | 581905 B | 4/2004 |
| TW | 200942899 A1 | 10/2009 |
| TW | 201001010 A1 | 1/2010 |

OTHER PUBLICATIONS

Sugita, et al., "In-Cell Projected Capacitive Touch Panel Technology", The 19th International Display Workshops, 2012, pp. 825-828.

Sugita et al., "In-Cell Projected Capacitive Touch Panel Technology", The Institute of Electronics, Information and Communication Engineers Transactions on Electronics, vol. E96-C, No. 11, Nov. 2013, pp. 1384-1390.

* cited by examiner (a)

(b)

(a)

(b)

TOUCH PANEL TERMINAL (BACK SURFACE)  DISPLAY DRIVING TERMINAL (FRONT SURFACE)

DISPLAY DRIVING TERMINAL (FRONT SURFACE)

TOUCH PANEL TERMINAL (BACK SURFACE)

TOUCH PANEL SUBSTRATE AND DISPLAY PANEL

TECHNICAL FIELD

The present invention relates to a touch panel substrate that is used in an in-cell touch panel and a display panel including such a touch panel substrate.

BACKGROUND ART

In recent years, there has been widespread use of display devices each having an integration of a display section and an input section for reduction in size of the devices. In particular, in the case of portable terminals such as mobile phones, PDAs (personal digital assistants), and laptop personal computers, there has been widespread use of display devices each including a touch panel that is capable of detecting the position of contact between a display surface and a finger or stylus (an object to be detected) brought into contact with the display surface.

There have conventionally been known various types of touch panel such as so-called resistive (pressure-sensitive) touch panels and capacitive touch panels. Among them, capacitive touch panels have been in widespread use.

A capacitive touch panel detects the position of contact between a display surface and a finger or stylus by detecting a change in capacitance that occurred when the finger or stylus was brought into contact with the display surface. This makes it possible to detect the position of contact with a simple operation.

Further, unlike a resistive touch panel, the capacitive touch panel does not require the formation of two electrically conductive films with an air layer sandwiched therebetween, and therefore does not suffer from interface reflection of outside light at the interface between an air layer and an electrically conductive film.

However, the capacitive touch panel, which detects the position of contact by detecting a change in capacitance, might be incapable of correct detection of the position of contact due to a change in line of electric force that is caused by extrinsic noise received by the touch panel.

Touch panels that have conventionally been in widespread use are out-cell or on-cell touch panels (e.g., see Patent Literature 1) that are mounted on the outer sides of display panels.

However, the provision of a touch panel on the outer side of a display panel undesirably causes emission noise to be generated from the display panel when a touch panel operation is carried out while a display is being carried out, so that there is an increase in the amount of noise that is received by the touch panel.

For this reason, the provision of a touch panel on the outer side of a display panel might cause a reduction in SN ratio (signal-to-noise ratio), with the result that the touch panel deteriorates in detection performance and therefore wrongly detects the position of contact.

Further, the provision of a touch panel on the outer side of a display panel undesirably causes the resulting device to increase in thickness and weight due to the stacking of the touch panel on the display panel.

Moreover, the provision of a touch panel on the outer side of a display panel causes outside light to be reflected not only on a surface of the touch panel but also at the interface between the touch panel and the display panel, so that contrast and viewability are adversely affected. Further, the provision of a touch panel on the outer side of a display panel causes viewability to deteriorate due to the touch panel per se.

Under such circumstances, an in-cell touch panel, i.e., a touch panel incorporated in a cell of a display panel or the like, has been under development from the point of view of reduction in thickness and weight, improvement in viewability, and cost advantages, such as reduction in the number of components, which are brought about by making touch panels "in-cell" (e.g., see Patent Literatures 2 and 3).

A typical example of an in-cell touch panel is a structure which constitutes an electro-optic device such as a display panel or a display device and which includes an array substrate such as a TFT (thin-film transistor) substrate, a counter substrate such as a CF (color filter) substrate, and a so-called sensor electrode so fabricated between the array substrate and the counter substrate as to serve as a position detecting electrode for detecting the position of contact with an object.

Patent Literatures 2 and 3 disclose a sensor electrode sandwiched between an insulating substrate of a CF substrate and a transparent counter electrode made of ITO (indium tin oxide), with the CF substrate used as a touch panel substrate (i.e., an in-cell touch panel substrate) to constitute an in-cell touch panel.

FIG. 34 is a cross-sectional view showing a configuration of a display device described in Patent Literature 2, and FIG. 35 is a plan view showing a configuration of a sensor electrode as taken along the line A-B shown in FIG. 34.

As shown in FIG. 34, a display device 300 described in Patent Literature 2 includes a display panel 304, and the display panel 304 includes a TFT substrate 301, a CF substrate 302, and a liquid crystal layer 303 sandwiched between the TFT substrate 301 and the CF substrate 302.

The CF substrate 302 includes an insulating substrate 311, a counter electrode 319 (common electrode), and a CF layer 318 provided between the insulating substrate 311 and the counter electrode 319, and the CF layer 318 is constituted by a light blocking section 316 (BM) and a plurality of colored layers 317 (CF) provided between adjacent parts of the light blocking section 316. The CF substrate 302 further includes a first electrode layer 312 and a second electrode layer 314 provided as a sensor electrode between the CF layer 318 and the insulating layer 311, with an insulating layer 313 provided between the first electrode layer 312 and the second electrode layer 314.

As shown in FIGS. 34 and 35, the first electrode layer 312 has a line portion 312a that extends linearly along a first direction and a bulge portion 312b that bulges from the line portion 312a. Further, the second electrode layer 314 has a line portion 314a that extends linearly along a second direction perpendicular to the first direction and a bulge portion 314b that bulges from the line portion 314a.

FIG. 36 is a cross-sectional view schematically showing a configuration of a main part of the CF substrate 302, which is used as a touch panel substrate to constitute an in-cell touch panel, of the display device 300 described in Patent Literatures 2 and 3, with the constituent layers stacked in the order shown. It should be noted that FIG. 36 is equivalent to a cross-sectional view schematically showing a configuration of a main part of the CF substrate 302 of the display device 300 shown in FIG. 34.

In Patent Literature 1, as shown in FIG. 34, an insulating layer 320 and a shield electrode 321 are provided between the CF layer 318 and the counter electrode 319. However, the insulating layer 320 and the shield electrode 321 are not illustrated here. Further, although FIG. 36 shows the light blocking section 316 (BM) and the colored layer 317 (CF) as if they are stacked, they are actually provided on substantially the same lamination level (see FIG. 34).

It should be noted that Patent Literatures 2 and 3 disclose that the first electrode layer 312 and the second electrode layer 314 may be made of, for example, a metal patterned into a grid shape (mesh shape), instead of being made of a sheet electronically conductive transparent material.

CITATION LIST

Patent Literature 1
Japanese Patent Application Publication, Tokukai, No. 2010-72584 A (Publication Date: Apr. 2, 2010)
Patent Literature 2
Japanese Patent Application Publication, Tokukai, No. 2010-72581 A (Publication Date: Apr. 2, 2010)
Patent Literature 3
Japanese Patent Application Publication, Tokukai, No. 2010-160745 A (Publication Date: Jul. 22, 2010)
Patent Literature 4
U.S. Pat. No. 6,452,514 (Registration Date: Jul. 17, 2002)

SUMMARY OF INVENTION

Technical Problem

However, according to the above conventional display devices, CR time constant (capacitor×resistor) becomes larger due to an effect of capacitances ($C_{D-C}$ and $C_{C-S}$) which are formed between (i) a first electrode layer and a counter electrode and (ii) the second electrode layer and a counter electrode as shown in FIG. 12. Hence, the conventional display devices might be incapable of normal operation as touch panels.

The present invention has been made in view of the foregoing problem, and it is an object of the present invention to provide a touch panel substrate which is high in position detection performance and capable of carrying out a stable position detecting operation and which is used in an in-cell touch panel, and to provide a display panel including such a touch panel substrate.

Solution to Problem

In order to attain the object, a touch panel substrate in accordance with the present invention is a touch panel substrate for use as one of a pair of substrates which constitute a display panel, the touch panel substrate including position detecting electrodes for detecting, based on a change in capacitance, a position of coordinates of a detection object, the touch panel substrate including: a counter electrode for being placed to face pixel electrodes provided on the other substrate of the pair of substrates which constitute the display panel together with the touch panel substrate; and a light blocking layer having a matrix pattern corresponding to pixels, the light blocking layer being made of an electrically conductive material and being electrically connected to the counter electrode.

According to the configuration, since the electrically conductive light blocking layer (black matrix) is connected to the counter electrode, it is possible to reduce the resistance of the counter electrode, so that the CR time constant can be reduced. Therefore, it is possible to provide a touch panel substrate which is high in position detection performance and capable of carrying out a stable position detecting operation and which is used in an in-cell touch panel.

Advantageous Effects of Invention

As described above, the touch panel substrate of the present invention is configured such that the light blocking layer is constituted by an electrically conductive material and is electrically connected to the counter electrode. Further, the display panel of the present invention includes the touch panel substrate. This makes it possible to provide a touch panel substrate which is high in position detection performance and capable of carrying out a stable position detecting operation and which is used in an in-cell touch panel, and to provide a display panel including such a touch panel substrate.

DESCRIPTION OF EMBODIMENTS

The following description discusses an embodiment of a display device including a touch panel function (hereinafter referred to as a "display device") in accordance with the present invention.

Figure 1:
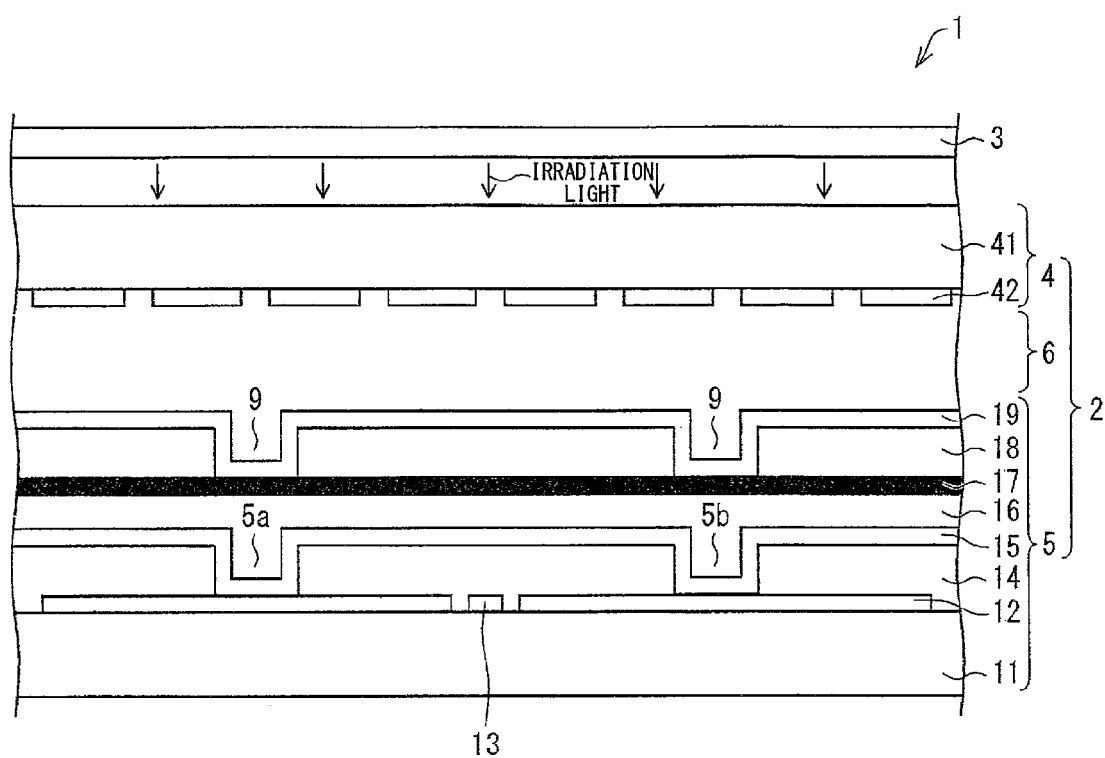
FIG. 1 is a cross-sectional view schematically showing a configuration of a display device in accordance with the present invention.

FIG. 1 is a cross-sectional view schematically showing a configuration of the display device in accordance with the present embodiment. A display device 1 shown in FIG. 1 includes (i) a display panel 2 having both a usual image display function and a capacitive touch panel function, (ii) various driving circuits (a data signal line driving circuit, a scanning signal line driving circuit etc. (not illustrated)) which drive the display panel 2, and (iii) a backlight 3 which emits light to the display panel 2.

The display panel 2 is an active-matrix liquid crystal display panel which includes a liquid crystal layer 6 sandwiched between a pair of substrates facing each other (one of which is a substrate active-matrix substrate 4, and the other of which is a counter substrate 5 (color filter (CF) substrate)). In the display panel 2, the counter substrate 5 faces toward a viewer, and the backlight 3 is disposed behind the active-matrix substrate 4.

The active-matrix substrate 4 is configured such that, on a glass substrate 41, various signal lines (not illustrated) such as scanning signal lines and data signal lines, transistors (TFTs) (not illustrated), pixel electrodes 42 corresponding to pixels arranged in a matrix pattern are provided. Note that a well-known configuration is applicable to the active-matrix substrate 4.

The counter substrate 5 includes not only a configuration to provide an image display function, but also a configuration to provide a touch panel function. The following description mainly discusses a specific exemplary configuration of the counter substrate 5 having the touch panel function.

Example 1

Figure 2:
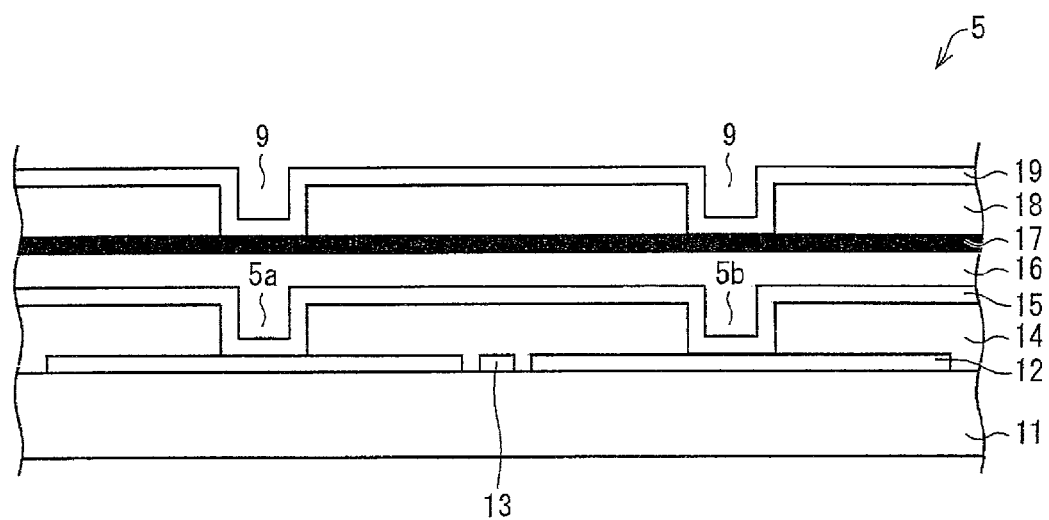
FIG. 2 is a cross-sectional view of a counter substrate in accordance with Example 1 of the present invention.

The display device 1 illustrated in FIG. 1 includes the display panel 2 and the counter substrate 5 in accordance with Example 1 as illustrated in FIG. 1. FIG. 2 shows the counter substrate 5 in accordance with the present Example 1. The counter substrate 5 includes a glass substrate 11, first electrodes 12, second electrodes 13, a first insulating layer 14, metal wires 15, a second insulating layer 16, a black matrix (BM) 17, a color filter layer 18, a counter electrode 19, and an alignment film (not illustrated), which are stacked in this order (see FIG. 2).

The first electrodes 12 and the second electrodes 13 which serve as a position detecting electrode are transparent electrodes made, for example, of an electrically conductive transparent material such as an oxide. Examples of the electrically conductive transparent material include ITO (indium tin oxide), IZO (indium zinc oxide), zinc oxide, tin oxide, etc.

Alternatively, the first electrodes 12 and the second electrodes 13 may be transparent electrodes, such as metal thin-film electrodes made of graphene or the like or thin-film carbon electrodes, which keep their transparency by being thin films. Since there is a trade-off between transmittance and the amount of electric power that is consumed by the backlight 3, it is desirable that the first electrodes 12 and the second electrodes 13 be formed so that their transmittance is 70% or higher.

Figure 3:
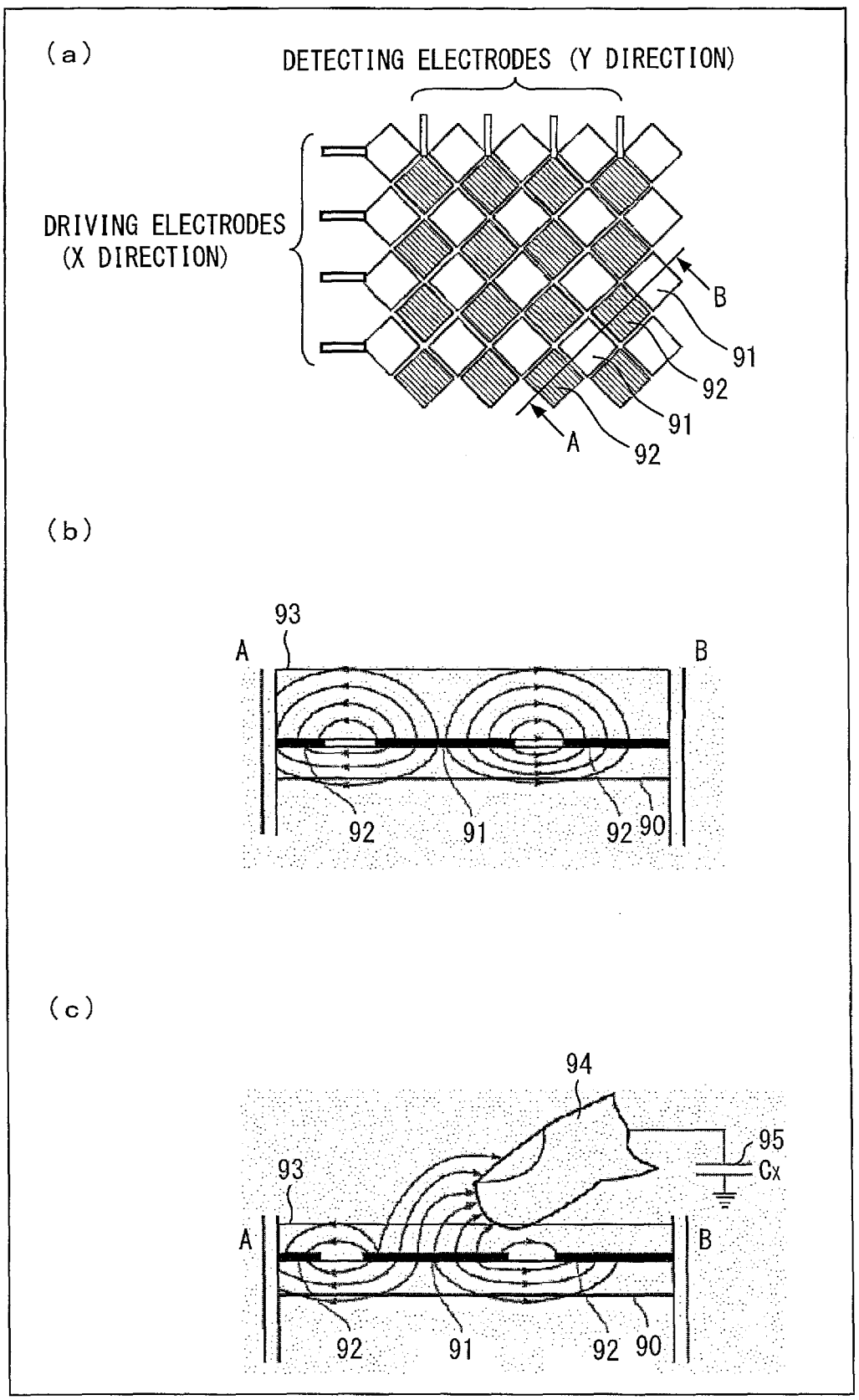
FIG. 3 is a set of diagrams (a) through (c) showing an example of a capacitive touch panel, (a) being a plan view explaining how electrodes of the touch panel are arranged, (b) being a cross-sectional view taken along the line A-B shown in (a) of FIG. 3, and the diagram (c) explaining an operation of the touch panel when a finger touches the touch panel.

Further, the first electrodes 12 and the second electrodes 13 are formed on the same lamination level. Note that it is further preferable that the first electrodes 12 and the second electrodes 13 be formed in the same plane. The first electrodes 12 and the second electrodes 13 provide the capacitive touch panel function. With reference to FIG. 3, an operation principle of a capacitive touch panel is discussed.

FIG. 3 is a set of diagrams (a) through (c) showing an example of the capacitive touch panel, (a) being a plan view explaining how electrodes of the touch panel are arranged, (b) being a cross-sectional view taken along the line A-B shown in (a) of FIG. 3, and the diagram (c) explaining an operation of the touch panel when a finger (an object to be detected) touches the touch panel.

In FIG. 3, the reference numeral 90 indicates a substrate made of a transparent insulator (dielectric). A plurality of driving electrodes 91 and a plurality of detecting electrodes 92 are provided on one surface of the substrate 90. A cover glass 93 is provided so as to cover the surface on which the driving electrodes 91 and the detecting electrode 92 are provided. The cover glass 93 is made of an insulating material (such as a transparent glass), which has a predetermined dielectric constant.

In (a) of FIG. 3, a specific connection structure is not shown, but the plurality of driving electrodes 91 are connected along an X-axis direction for each line, and the plurality of detecting electrodes 92 are connected along a Y-axis direction for each line. Application of drive voltages to each of the driving electrodes 91 and the detecting electrodes 92 forms capacitances, via the substrate 90 and the cover glass 93, between the driving electrodes 91 and the detecting electrodes 92, so that lines of electric force are formed (see (b) of FIG. 3).

In such a state, as shown in (c) of FIG. 3, when a fingertip 94 touches a part of a surface of the cover glass 93, a capacitance 95 is formed between the part and a ground via a human body, with the result that some of the lines of electric force are grounded via the fingertip 94. This means that there is a significant change in capacitance between the driving electrodes 91 and the detecting electrodes 92 located at the part touched by the fingertip 94, and where is touched by the fingertip 94 can be detected by detecting the change.

In the present embodiment, the position detecting circuit for detecting the coordinate position of an object to be detected may be a well-known circuit (e.g., see Patent Literature 4), but is not to be particularly limited.

Figure 4:
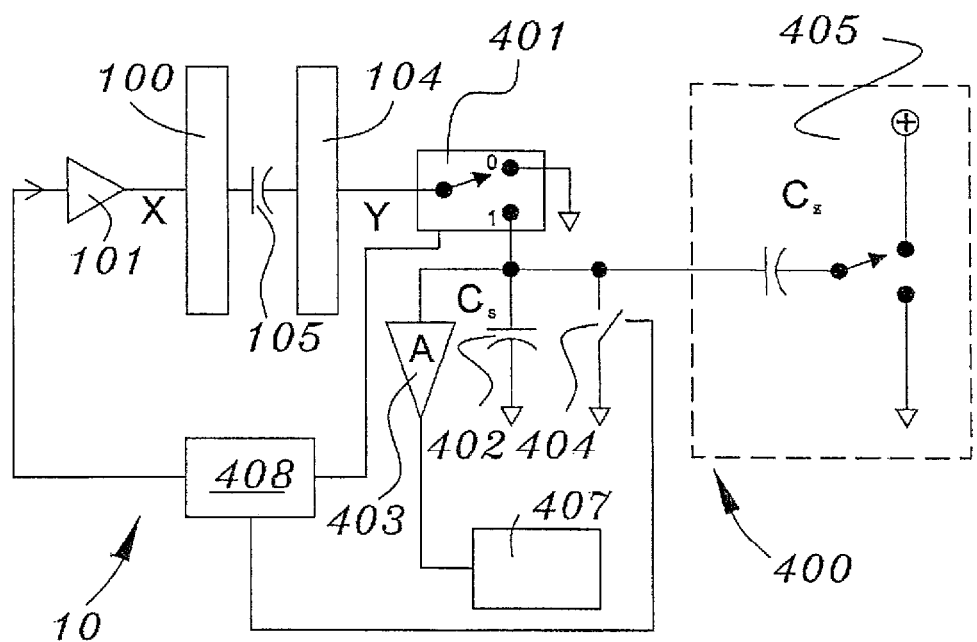
FIG. 4 is a block diagram of a position detecting circuit of a reciprocally-capacitive touch panel.
Figure 5:
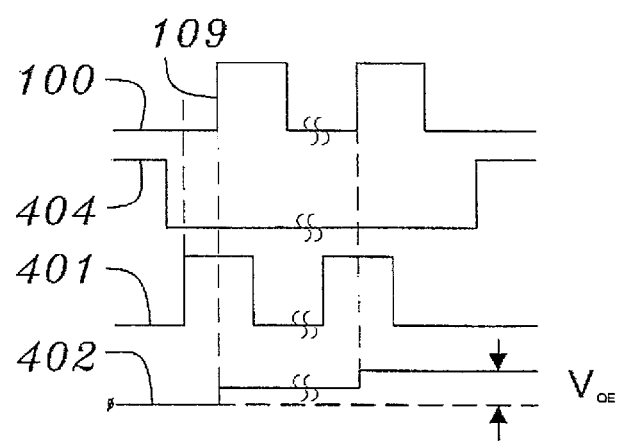
FIG. 5 is a timing chart showing an operation of the position detecting circuit of FIG. 4.

FIG. 4 is a circuit diagram of a reciprocally-capacitive touch panel in accordance with Patent Literature 4, on which most capacitive touch panels are based. FIG. 5 is a timing chart showing an operation of the circuit.

A transmitting electrode (driving electrode) 100 and a receiving electrode (detecting electrode) 104 are connected by a capacitor 105, and on a side of the receiving electrode, a switch 401, a storage capacitor 402, a reset switch 404, and an output amplifier 403 are provided. The transmitting electrode 100 generates a rectangular waveform 109 by an amplifier 101. First, reset is carried out, and measurement is carried out after charge transfer and hold have been repeated. Note, here, that the cross capacitor 105 changes depending on whether a finger touches the touch panel or not (e.g., the cross capacitor reduces when the finger touches the touch panel), so that a position touched by a fingertip can be detected by measuring a difference in the output voltage 402.

Figure 6:
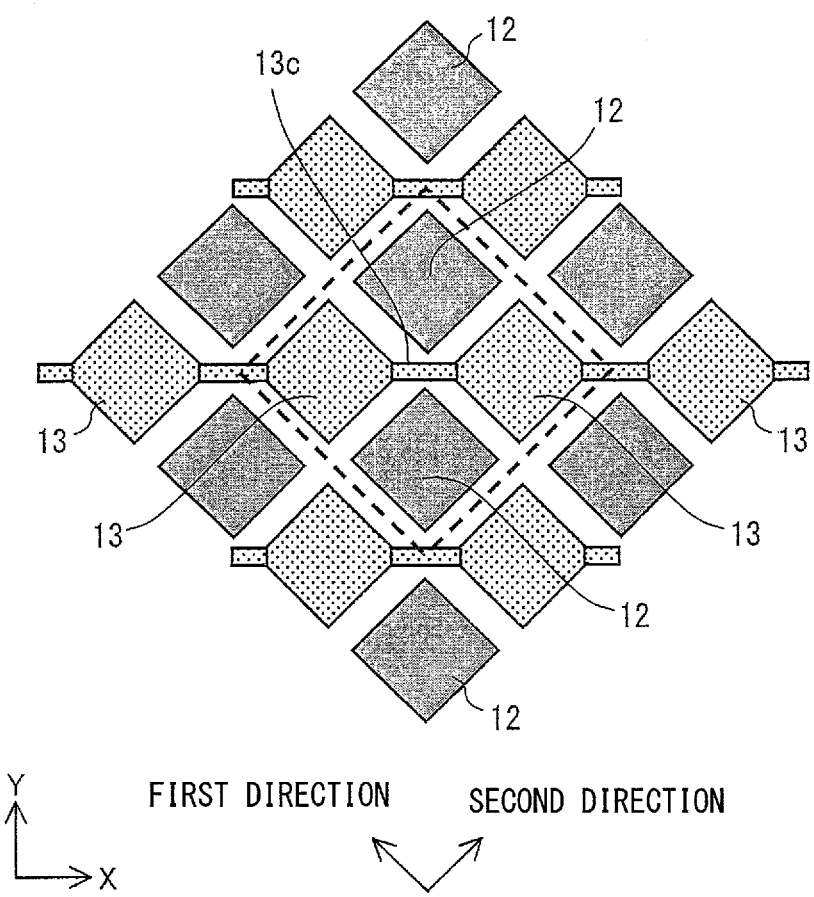
FIG. 6 is a plan view showing how first electrodes and second electrodes on the counter substrate of FIG. 2 are arranged.

In the display panel 2 in accordance with the present embodiment, (i) either the first electrodes 12 or the second electrodes 13 serve as driving electrodes and (ii) the other electrodes serve as the detecting electrodes. Further, the plurality of first electrodes 12 and the plurality of second electrodes 13 are successively arranged along an X direction and a Y direction, respectively, and the plurality of first electrodes 12 and the plurality of second electrodes 13 are alternately arranged along a first direction and a second direction, respectively (see FIG. 6). Further, the plurality of second electrodes 13 arranged along the X direction are electrically connected to each other via transparent relay electrodes 13c (connecting wires) which are formed on the same lamination level as the second electrodes 13. Note that, the first electrodes 12 and the second electrodes 13 each form a rectangular shape (e.g., a square shape) in FIG. 6, but the shape is not limited to this.

The metal wires 15 are formed in a grid. The plurality of metal wires 15 are provided corresponding to each of the plurality of first electrodes 12 and second electrodes 13. The plurality of metal wires 15 are provided so as to be electrically disconnected from each other. The following description discusses a specific configuration of the metal wires 15, the first electrodes 12, and the second electrodes 13.

Figure 7:
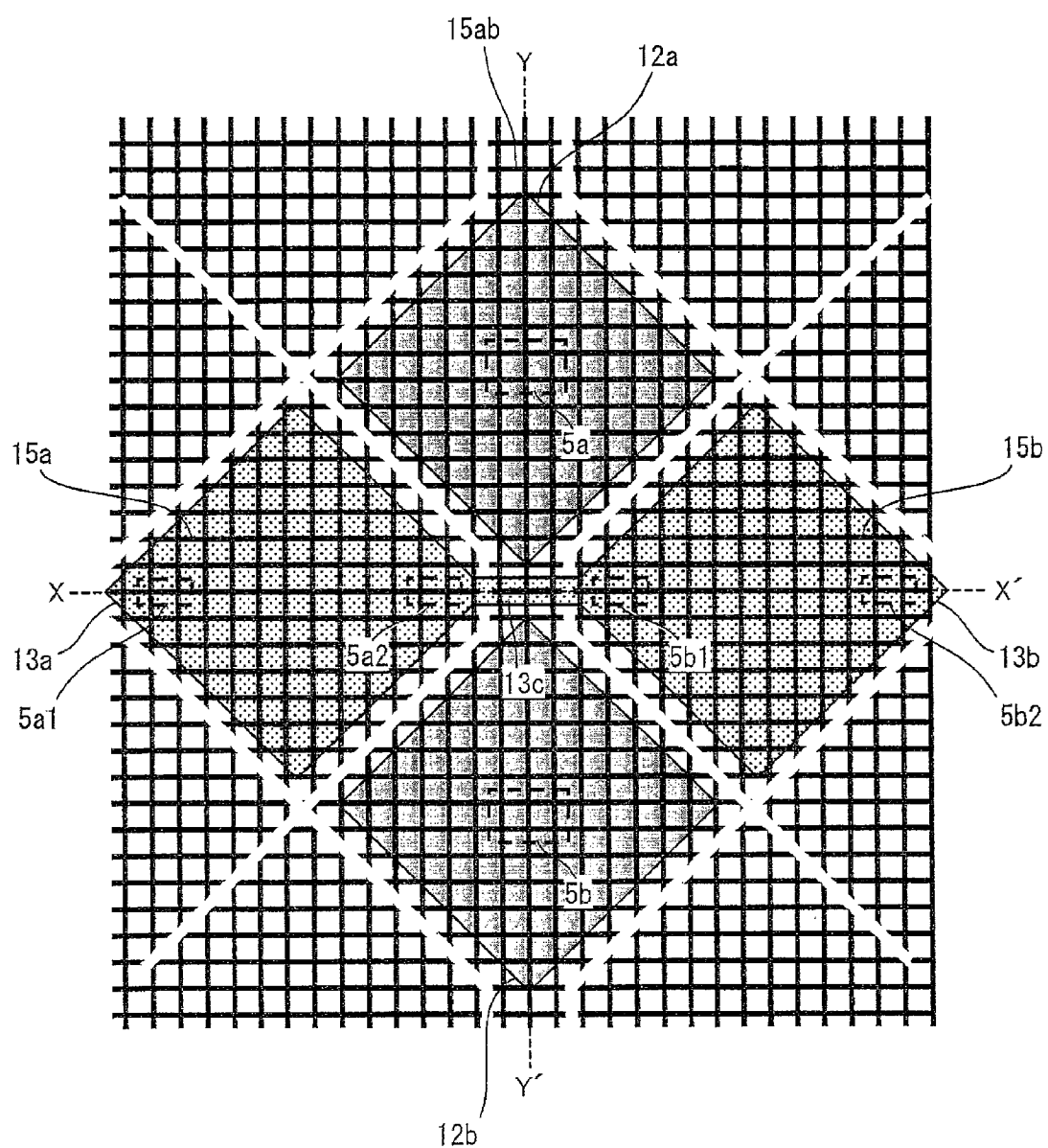
FIG. 7 is a plan view showing a connection relationship between the first electrodes and the second electrodes shown in FIG. 6.
Figure 8:
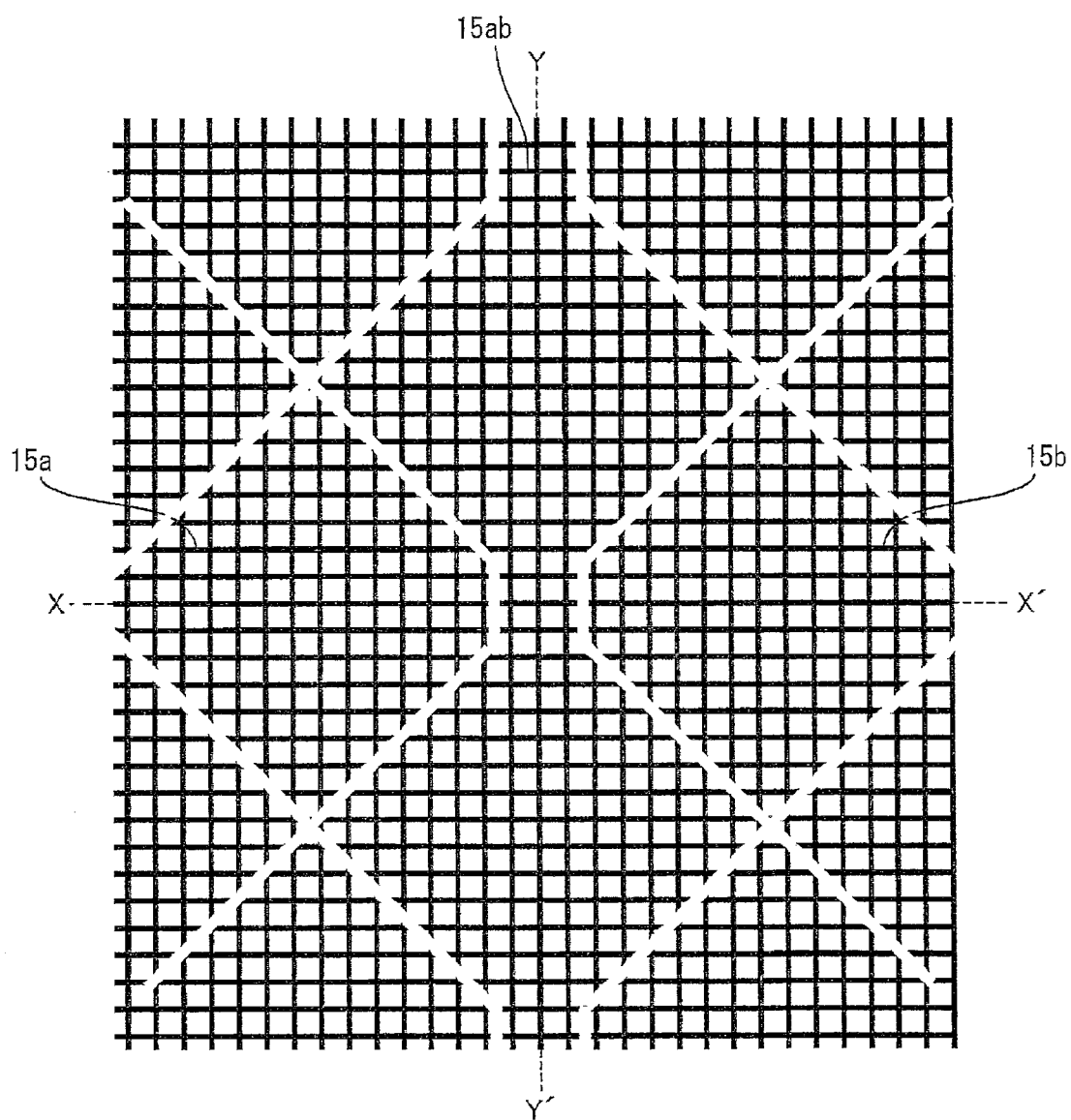
FIG. 8 is a plan view showing a part of metal wires in the counter substrate of FIG. 2.
Figure 9:
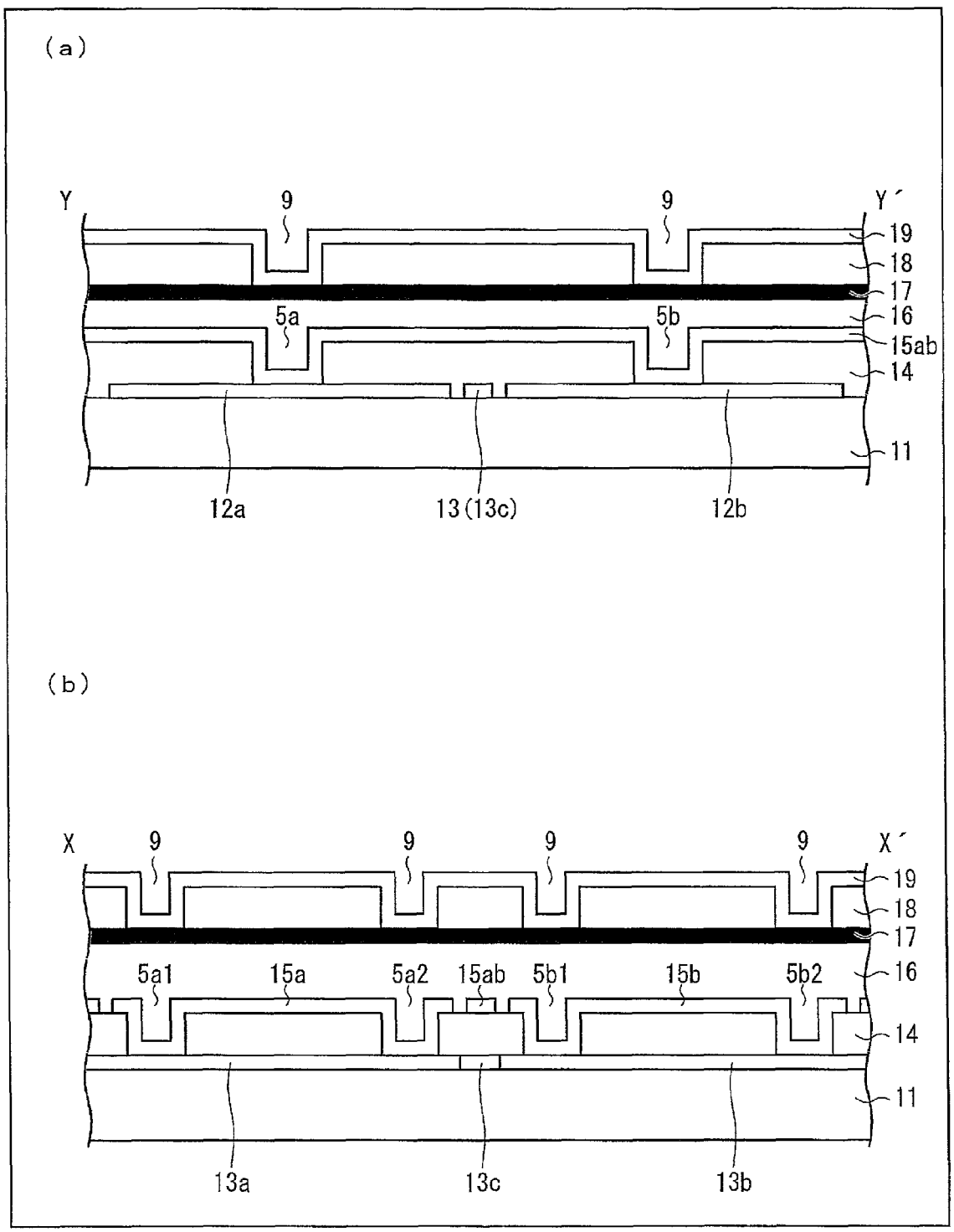
FIG. 9 is a set of diagrams (a) and (b), (a) being a cross-sectional view taken along the line Y-Y' shown in FIG. 7, and (b) being a cross-sectional view taken along the line X-X' shown in FIG. 7.

FIG. 7 is a plan view showing a connection relationship between the first electrodes 12 and the second electrodes 13. FIG. 8 is a plan view showing a part of the metal wires 15. Further, FIG. 9 is a set of diagrams (a) and (b), (a) being a cross-sectional view taken along the line Y-Y' shown in FIG. 7, and (b) being a cross-sectional view taken along the line X-X' shown in FIG. 7. FIG. 7 shows two adjacent first electrodes 12a and 12b, two adjacent second electrodes 13a and 13b, metal wire 15ab corresponding to each of the first electrodes 12a and 12b, metal wire 15a corresponding to the second electrode 13a, metal wire 15b corresponding to the second electrode 13b, which are included in a region surrounded by the dotted line shown in FIG. 6. Note that FIG. 8 shows metal wires 15a, 15b, and 15ab shown in FIG. 7.

The first electrode 12a is connected, via a contact hole 5a, to the metal wire 15ab which is provided on a lamination level different from a lamination level on which the first electrodes 12 (12a and 12b) are provided, similarly, the first electrode 12b is connected, via a contact hole 5b, to the metal wire 15ab, so that the first electrodes 12a and 12b are electrically connected to each other via the metal wire 15ab (see FIG. 7, and (a) of FIG. 9). That is, the metal wire 15ab makes bridge connections between the first electrodes 12a and 12b in such a way as to bridge between the first electrodes 12a and 12b.

The second electrodes 13a and 13b are electrically connected to each other via the relay electrodes 13c (see FIGS. 6 and 7) provided on the same lamination level as the second electrodes 13a and 13b (see FIG. 7, and (b) of FIG. 9). Further, the metal wire 15a corresponding to the second electrode 13a is connected, via contact holes 5a1 and 5a2, to the second electrode 13a, and the metal wire 15b corresponding to the second electrode 13b is connected, via contact holes 5b1 and 5b2, to the second electrode 13b.

Figure 10:
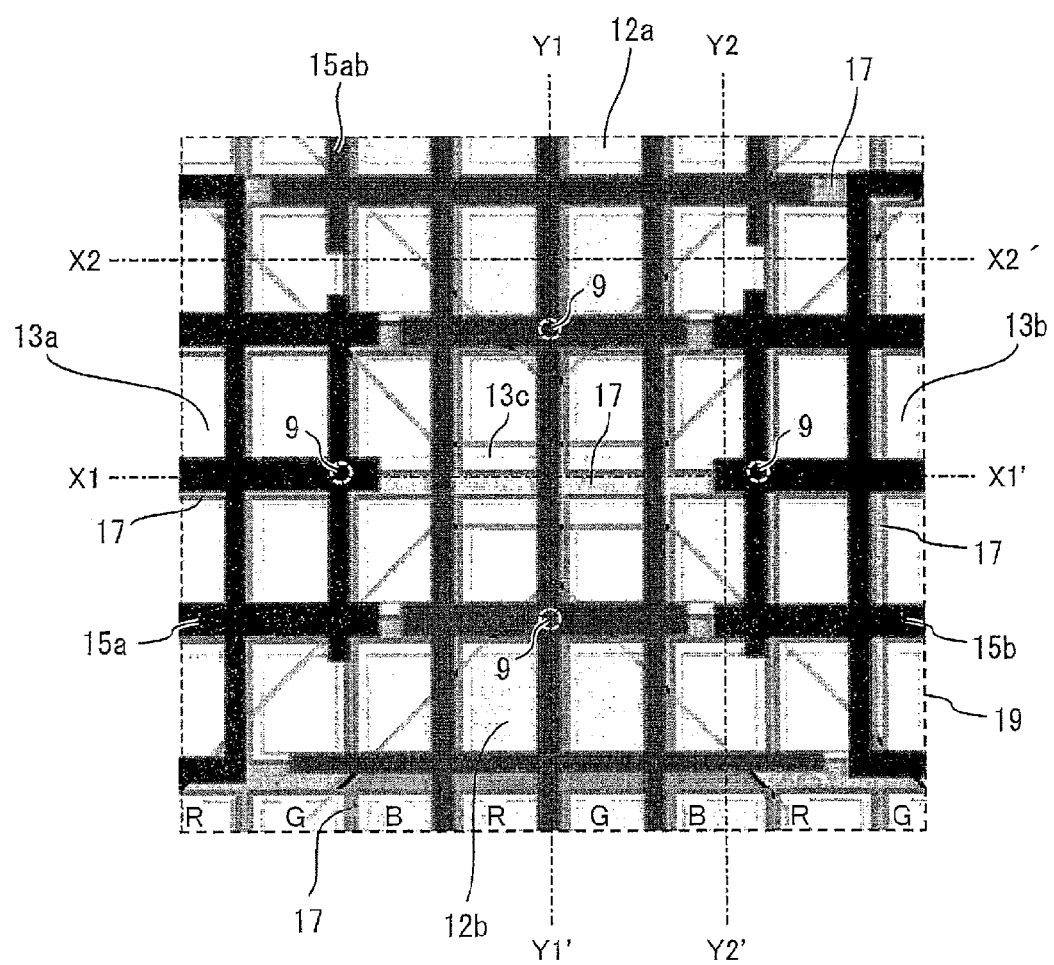
FIG. 10 is a plan view showing a connection relationship between a black matrix and the counter electrode on the counter substrate of FIG. 2.
Figure 11:
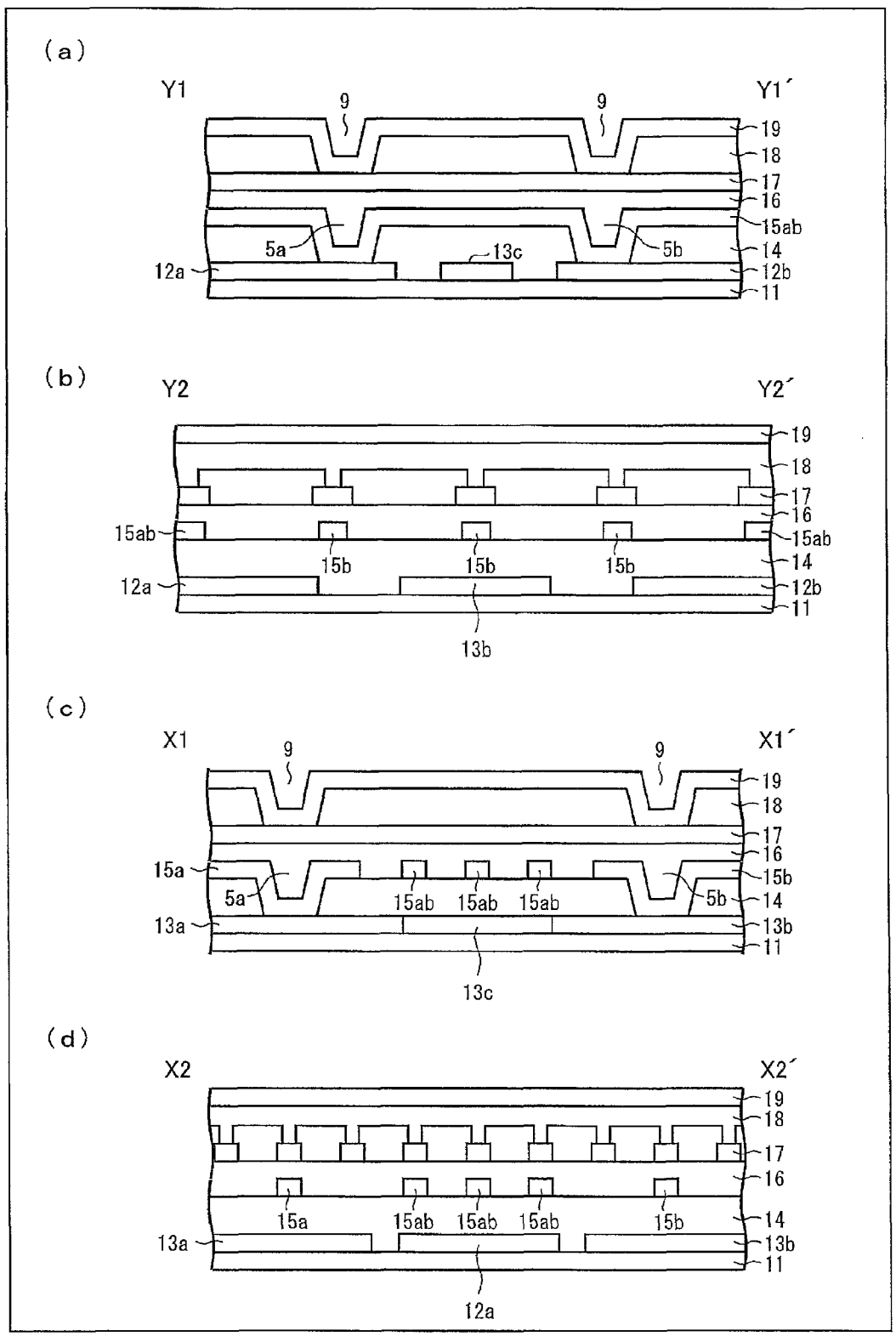
FIG. 11 is a set of diagrams (a) through (d), (a) being a cross-sectional view taken along the line Y1-Y1' shown in FIG. 10, (b) being a cross-sectional view taken along the line Y2-Y2' shown in FIG. 10, (c) being a cross-sectional view taken along the line X1-X1' shown in FIG. 10, and (d) being a cross-sectional view taken along the line X2-X2' shown in FIG. 10.

FIG. 10 is a plan view showing a connection relationship between a black matrix 17 and the counter electrode 19. FIG. 11 is a set of diagrams (a) through (d), (a) being a cross-sectional view taken along the line Y1-Y1' shown in FIG. 10, (b) being a cross-sectional view taken along the line Y2-Y2' shown in FIG. 10, (c) being a cross-sectional view taken along the line X1-X1' shown in FIG. 10, and (d) being a cross-sectional view taken along the line X2-X2' shown in FIG. 10. FIGS. 10 and 11 partly show the first electrodes 12a and 12b, the second electrodes 13a and 13b, and the metal wires 15ab, 15a, and 15b. Further, since the counter electrode 19 is a transparent electrode in a solid state, the counter electrode 19 is shown as a region indicated by the peripheral dotted line in FIG. 10.

The black matrix 17 is made of an electrically conductive film, which is low in resistance. The black matrix 17 is provided so as to overlap the metal wires 15 when the display panel 2 (counter substrate 5) is seen in plan view (see FIG. 10). Further, the black matrix 17 is electrically connected to the counter electrode 19 via a plurality of contact holes 9 (see FIG. 10, and (a) and (c) of FIG. 11).

The following explains effects on performance of the touch panel by capacitors that are formed between (i) the position detecting electrode (the first and second electrodes) which constitutes the touch panel and (ii) the counter electrode which constitutes an image display panel.

Figure 12:
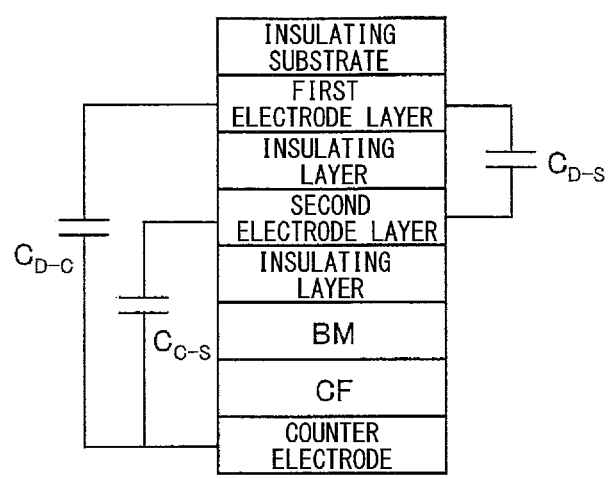
FIG. 12 is a cross-sectional view schematically showing a conventional display panel.
Figure 13:
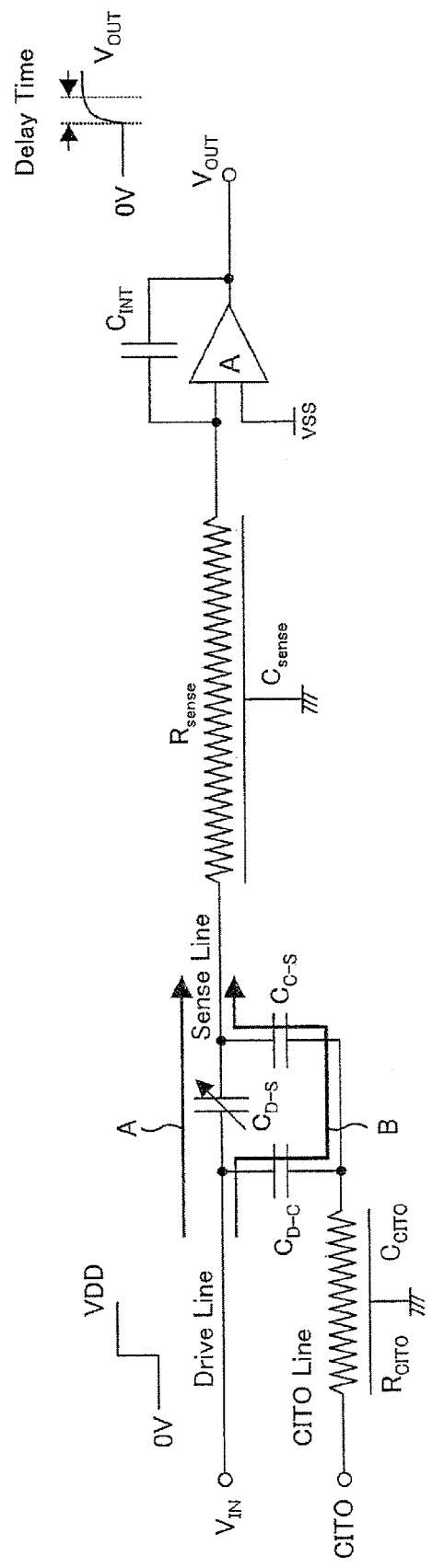
FIG. 13 is a diagram showing a driving circuit of a capacitive touch panel.
Figure 14:
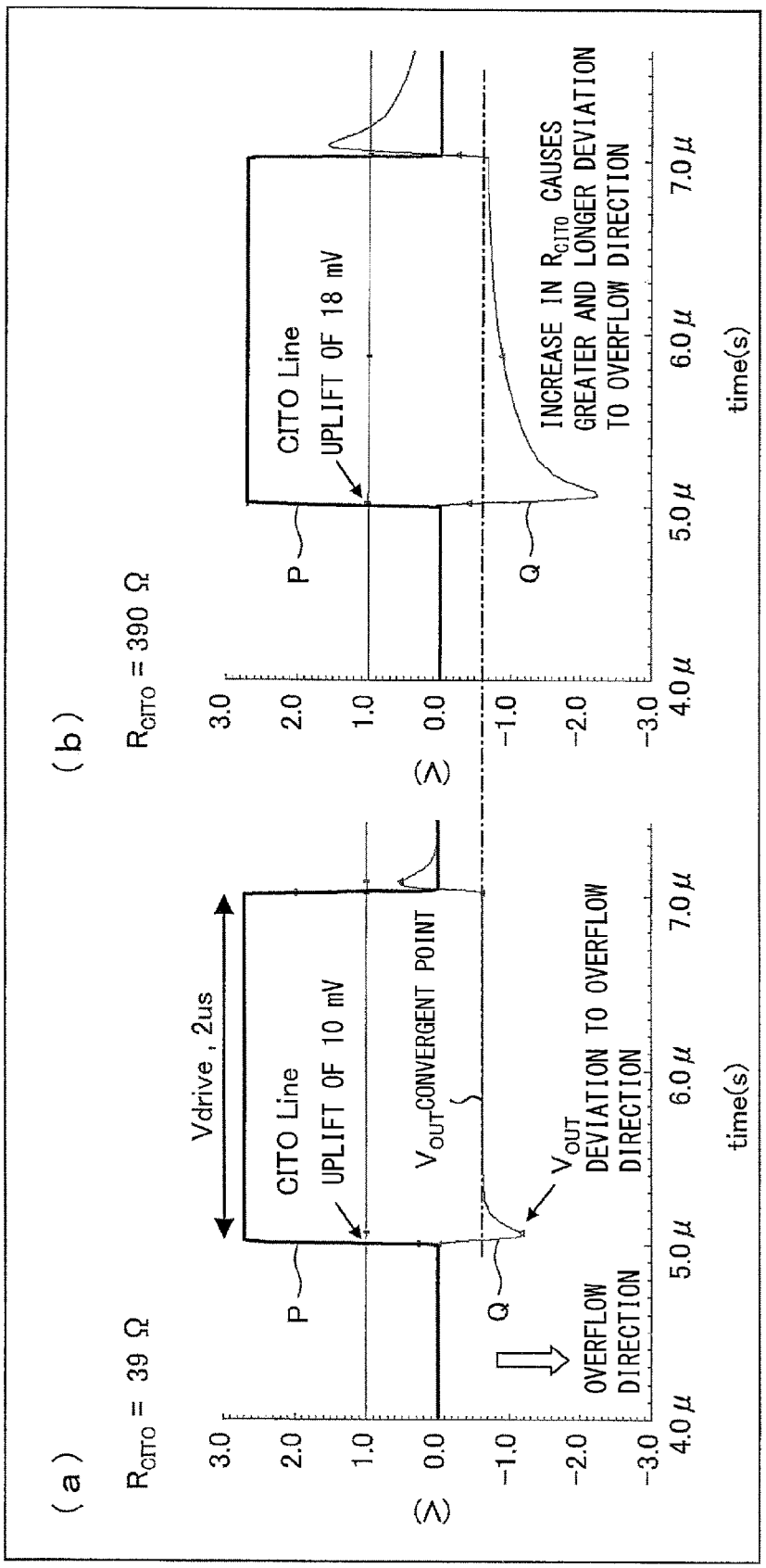
FIG. 14 is a set of simulated waveform charts schematically showing the operation of the driving circuit shown in FIG. 13.

FIG. 12 is a cross-sectional view schematically showing a conventional display panel. FIG. 13 is a diagram showing a driving circuit of a capacitive touch panel. FIG. 14 is a set of simulated waveform charts schematically showing the operation of the driving circuit. It should be noted that for the simulation, MSC Software's "Patran" (product name) was used.

In FIGS. 12 and 13, $C_{D-S}$ is a touch-detecting capacitor that is formed between a driving electrode (e.g., the first electrode) and a detecting electrode (e.g., the second electrode) of the touch panel, and since its capacitance varies depending on whether or not a fingertip or the like touches the touch panel, the capacitor is described as a variable capacitor. It should be noted that, the Drive Line corresponds to the output terminal of the driving electrode, the Sense Line corresponds to the output terminal of the detecting electrode, and the CITO Line corresponds to the output terminal of the counter electrode. The detecting circuit has an integrated circuit constituted by an operational amplifier and a capacitor $C_{INT}$, and an output indicating whether or not a fingertip or the like touches is obtained as $V_{OUT}$ from this integrated circuit. $C_{D-C}$ is a parasitic capacitor that is formed between the driving electrode and the counter electrode, and $C_{C-S}$ is a parasitic capacitor that is formed between the detecting electrode and the counter electrode. $R_{sence}$ is the resistance of the detecting electrode, and $R_{CITO}$ is the resistance of the counter electrode.

In a structure (so-called out-cell type) where the touch panel is provided outside the display panel, the dominant current pathway is a pathway indicated by the arrow A in FIG. 13. In a structure (so-called in-cell type), like the present invention, where the touch panel is provided inside the display panel, there exists a further parasitic current pathway indicated by the arrow B.

In (a) and (b) of FIG. 14, the thick line P indicates the voltage waveform of the Drive Line, and the thin line Q indicates the voltage waveform of the output voltage $V_{OUT}$. As shown in (a) and (b) of FIG. 14, it is shown that since in a case where the resistance of the counter electrode is high (e.g., $R_{CITO}=390\Omega$), the CR time constant (capacitor×resistor) increases due to the effect of the parasitic current pathway indicated by the arrow B in FIG. 13, it takes a long time to converge to its original output voltage (see (b) of FIG. 14). This causes an increase in integral time and accordingly a reduction in the number of integrals, thus causing a reduction in SN ratio. This causes deterioration in performance of the touch panel.

According to the above consideration, in order to enhance the performance of the touch panel, it is effective to increase the SN ratio by reducing the resistance of the counter electrode ($R_{CITO}$). In this regard, according to the display panel 2 in accordance with the present embodiment, the black matrix 17 made of an electrically conductive material is electrically connected to the counter electrode 19 (see FIGS. 1 and 9), so that the resistance of the counter electrode 19 ($R_{CITO}$) can be reduced. This makes it possible to reduce the CR time constant and increase the SN ratio, so that, in the display panel 2 including the in-cell touch panel function, position detecting performance of the touch panel can be enhanced and a stable position detecting operation can be carried out.

(Method for Producing Display Panel)

Next, a method for producing the display panel 2 is discussed. The method for producing the display panel 2 includes steps for (i) producing an active-matrix substrate, (ii) producing a counter substrate, and (iii) assembling in which the active-matrix substrate and the counter substrate are combined, and thereafter a liquid crystal is filled therein.

The active-matrix substrate can be produced by a process that uses known techniques. As such, the process is not described here.

Figure 15:
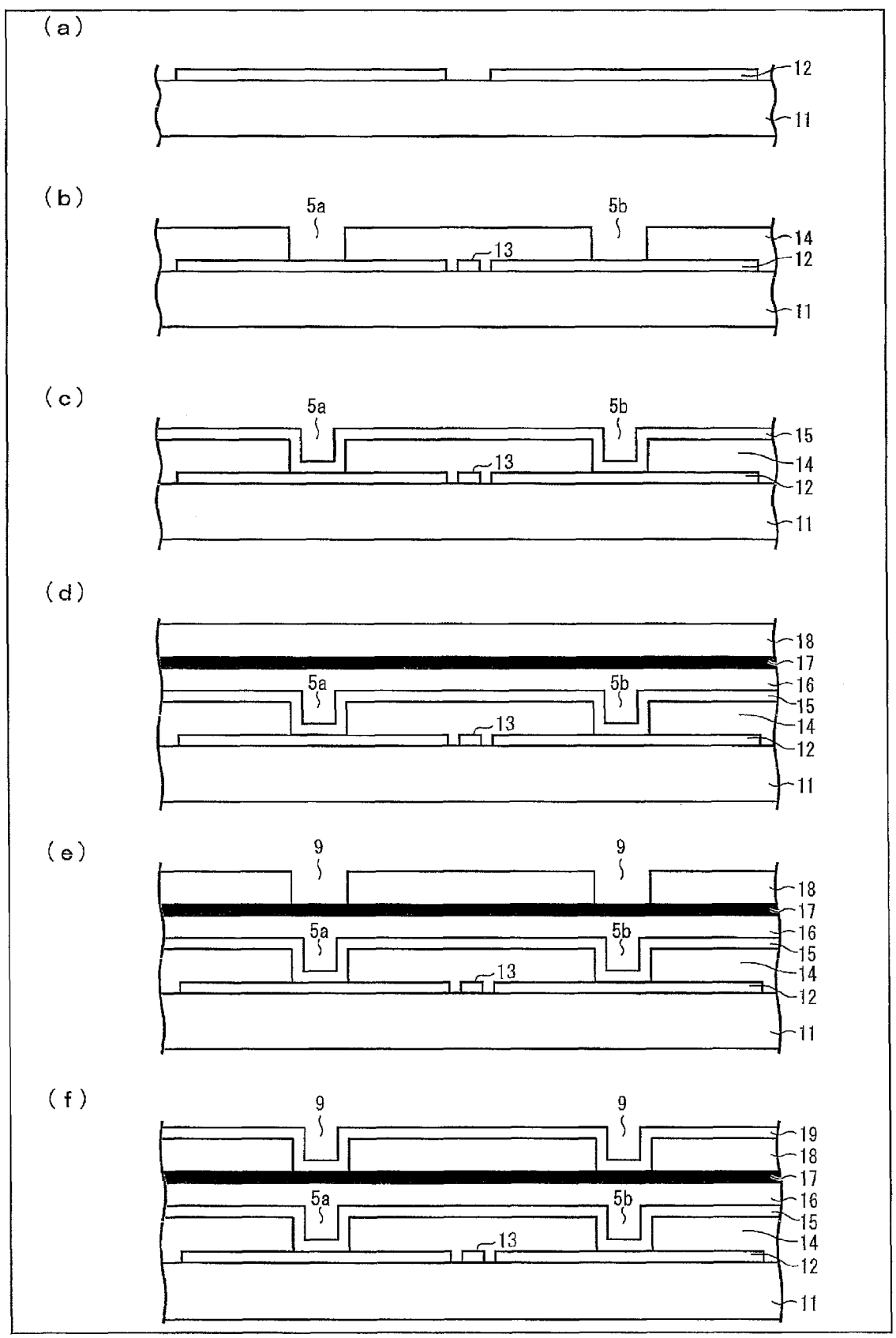
FIG. 15 is a set of views (a) through (f) showing steps of a process for fabricating the counter substrate in accordance with Example 1.

The following description discusses, with reference to FIG. 15, the process for fabricating the counter substrate 5. Note that FIG. 15 corresponds to the cross section taken along the line Y-Y' shown in FIG. 7.

First, a film such as an electrically conductive transparent film made of ITO, IZO (Indium Zinc Oxide), zinc oxide, tin oxide, etc., or a metal thin-film such as graphene is formed on a substrate such as a glass or a plastic (the glass substrate 11 is used here) by sputtering. Then, patterning with respect to the film is carried out by photolithography (including an etching step), and thereafter a resist is removed, so that the position detecting electrode (the first electrodes 12 and the second electrodes 13) is formed (see (a) of FIG. 15).

Next, an insulating film is formed by CVD (chemical vapor deposition) or spin coating on the entire glass substrate 11 on which the first electrodes 12 and the second electrodes 13 are formed. Then, a photoresist is removed. In this way, a first insulating film 14 is formed. Then, patterning of contact holes with respect to the first insulating film 14 is carried out by photolithography, and the first insulating film 14 is etched away to form the contact holes 5a and 5b (see (b) of FIG. 15).

Next, on the first insulating film 14 in which the contact holes 5a and 5b are formed, any one of (i) a low-resistance metal film such as titanium (Ti), copper (Cu), gold (Au), aluminum (Al), tungsten (W), zinc (Zn), nickel (Ni), tin (Sn), chromium (Cr), molybdenum (Mo), and tantalum (Ta)), (ii) a metal compound thereof and, and (iii) a metal silicide thereof is formed. Then, patterning with respect to the film is carried out by photolithography so as to form the metal wires 15 (see (c) of FIG. 15). For lower resistance, it is desirable that the metal wires 15 each have a thickness of 100 nm or larger for low resistance, and for securement of the flatness of the counter electrode 19 and a reduction in processing costs, it is desirable that the metal wires 15 each have a thickness of 300 nm or smaller.

Next, an insulating film is formed on the entire substrate on which the metal wires 15 are formed by, for example, CVD or spin coating, and a photoresist is removed, and thereafter a second insulating film 16 is formed. Next, on the second insulating film 16, any one of (i) a low-resistance metal film such as titanium (Ti), copper (Cu), gold (Au), aluminum (Al), tungsten (W), zinc (Zn), nickel (Ni), tin (Sn), chromium (Cr), molybdenum (Mo), and tantalum (Ta)), (ii) a metal compound thereof and, and (iii) a metal silicide thereof, which film is a low-resistance and light-blocking film, is formed, and patterning with respect to the film is carried out by photolithography so as to form the black matrix 17. Then, pattern formation of the color filter layer 18 for red, green, and blue is carried out in space in the black matrix 17 by a pigment dispersion etc. (see (d) of FIG. 15).

Next, patterning of contact holes with respect to the color filter layer 18 is carried out by photolithography, and the color filter layer 18 is etched away to form the contact holes 9 (see (e) of FIG. 15).

Next, an electrically conductive transparent film made of ITO, IZO, zinc oxide, tin oxide etc. is formed on the color filter layer 18, so that the counter electrode 19 is formed (see (f) of FIG. 15).

Finally, the alignment film (not illustrated) is formed on the counter electrode 19. In this way, the counter substrate 5 can be fabricated.

Note that, examples for the material for the first insulating film 14 and the second insulating film 16 include (i) organic insulating materials (photosensitive resins) such as acrylic resin, epoxy resin, polyurethane resin, and polyimide resin, and (ii) insulating, transparent inorganic insulating materials such as a SiNx film (silicon nitride film). Among others, the material is preferably a resin, such as a photosensitive resin, which includes an organic insulating material. The first insulating film 14 and the second insulating film 16 are therefore preferably so-called organic insulating films.

An organic insulating film can be thicker than an inorganic insulating film, and is lower in dielectric constant than an inorganic insulating film. Nitrogen silicon, for example, has a dielectric constant ∈ of 6.9, whereas acrylic resin has a dielectric constant ∈ of 3.7. Further, an organic insulating film is so high in transparency, that it can be made thick.

Therefore, in a case where the first insulating film 14 and the second insulating film 16 are organic insulating layers, they can be thick and low in dielectric constant. Both of these characteristics allow the parasitic capacitance between the position detecting electrode and the counter electrode 19 to be reduced.

If the first insulating film 14 and the second insulating film 16 each have an excessively thin thickness, there will be an increase in parasitic capacitance between the position detecting electrode and the counter electrode 19. In contrast, if the first insulating film 14 is excessively thick, it will be difficult to form the contact holes 5a and 5b, and if the second insulating film 16 is excessively thick, it will be difficult to form the contact holes 9. It is therefore preferable that the first insulating film 14 and the second insulating film 16 each have a thickness within a range of 1 μm to 3.5 μm.

Alternatively, it can be configured such that either the first insulating film 14 or the second insulating film 16 is formed by the inorganic insulating film, and the other of the first insulating film 14 and the second insulating film 16 is formed by the organic insulating film.

The following description discusses a process for assembling the display panel 2.

First, a seal material made of a thermosetting epoxy resin etc. in a frame pattern having a liquid crystal injection inlet is applied to one of the active-matrix substrate 4 and the counter substrate 5 by screen printing, and then spherical spacers which are made of plastic or silica and which have a diameter equivalent to the thickness of a liquid crystal layer are dispersed onto the other one of the active-matrix substrate 4 and the counter substrate 5. Instead of the spacers being dispersed, spacers may be formed on the black matrix 17 of the counter substrate 5 or on metallic wires of the active-matrix substrate 4.

Next, the active-matrix substrate 4 and the counter substrate 5 are joined on top of each other, and the seal material is cured.

Finally, a liquid crystal material is injected, by decompressing, into a space defined by the active-matrix substrate 4, the counter substrate 5, and the seal material. After that, a UV cure resin is applied to the liquid crystal injection inlet, and the UV cure resin is irradiated with UV radiation to seal in the liquid crystal material, whereby the liquid crystal layer 6 is formed. As such, the display panel 2 is produced.

The following description discusses other examples of the counter substrate 5. For convenience of explanation, like members having like function as those in Example 1 are assigned with like reference numerals, and their descriptions are omitted here. Further, unless otherwise specified, terms defined in Example 1 are also used as the same terms in the following Examples.

Example 2

Figure 16:
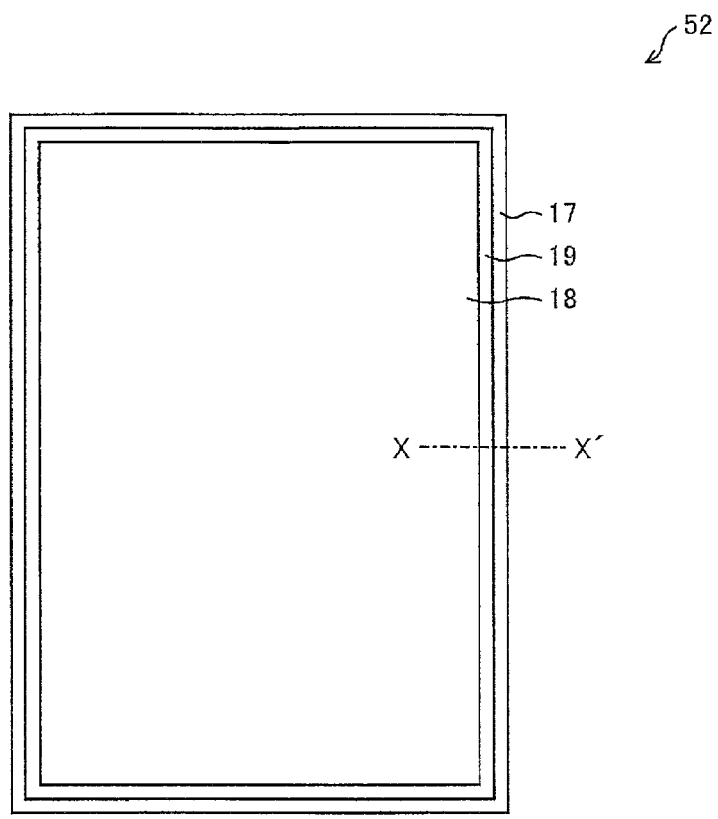
FIG. 16 is a plan view schematically showing a configuration of a display panel in accordance with Example 2.
Figure 17:
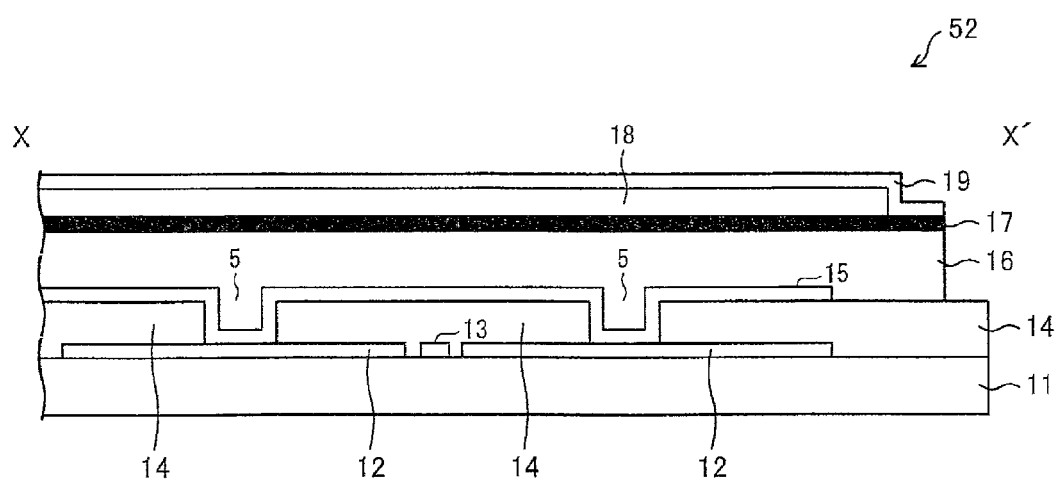
FIG. 17 is a cross-sectional view taken along the line X-X' shown in FIG. 16.

FIG. 16 is a plan view schematically showing a configuration of a counter substrate 52 in accordance with Example 2. FIG. 17 is a cross-sectional view taken along the line X-X' shown in FIG. 16.

The counter substrate 52, similar to the counter substrate 5 shown in Example 1, includes, on a glass substrate 11, first electrodes 12, second electrodes 13, a first insulating layer 14, metal wires 15, a second insulating layer 16, a black matrix (BM) 17, a color filter layer 18, a counter electrode 19, and an alignment film (not illustrated), which are stacked in this order (see FIG. 17).

Compared with the counter substrate 5 in accordance with Example 1, the counter substrate 52 in accordance with the present example differs in a connecting position between the black matrix 17 and the counter electrode 19. Specifically, the counter substrate 52 is configured such that, at an outer peripheral edge of a display panel 2, the counter electrode 19 is formed (as a film) on the black matrix 17, so that the black matrix 17 and the counter electrode 19 are electrically connected to each other (see FIG. 17).

According to the above configuration, the present example can omit, in the production process, the step for electrically connecting the black matrix 17 and the counter electrode 19 to each other, that is, the step for forming contact holes 9 of the counter substrate 5 shown in (e) of FIG. 15. This makes it possible to simplify the process for producing the counter substrate 52 and reduce production costs.

Example 3

Figure 18:
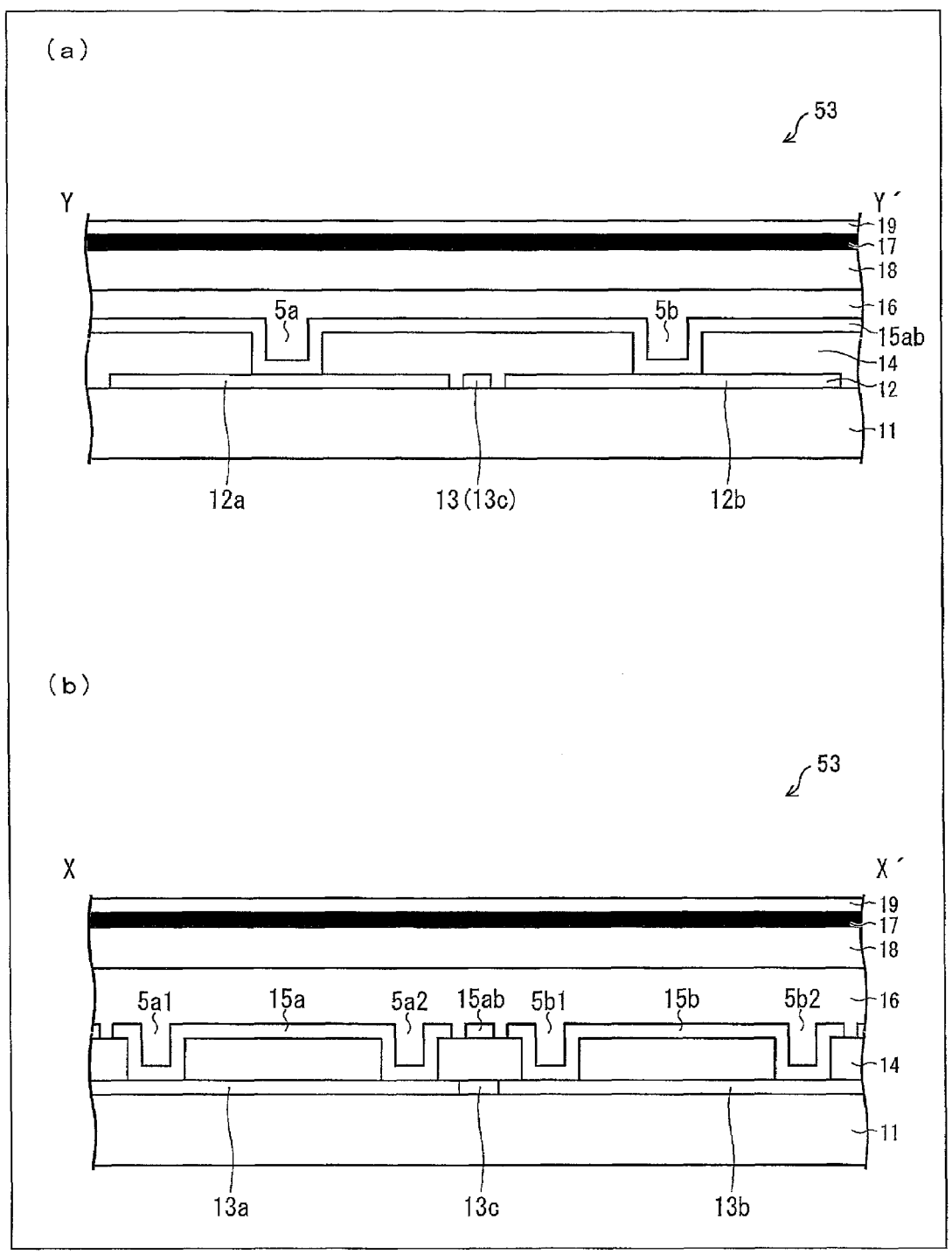
FIG. 18 is a set of cross-sectional views (a) and (b) showing a counter substrate in accordance with Example 3, (a) corresponding to the cross-sectional view taken along the line Y-Y' shown in FIG. 7, and (b) corresponding to the cross-sectional view taken along the line X-X' shown in FIG. 7.

FIG. 18 is a set of cross-sectional views (a) and (b) showing a counter substrate 53 in accordance with Example 3. Note that, (a) corresponds to the cross-sectional view taken along the line Y-Y' shown in FIG. 7, and (b) corresponds to the cross-sectional view taken along the line X-X' shown in FIG. 7.

The counter substrate 53 includes, on a glass substrate 11, first electrodes 12, second electrodes 13, a first insulating layer 14, metal wires 15, a second insulating layer 16, a color filter layer 18, a black matrix (BM) 17, a counter electrode 19, and an alignment film (not illustrated), which are stacked in this order (see FIG. 18). That is, compared with the counter substrate 5 in accordance with Example 1, the counter substrate 53 in accordance with the present example is configured such that where to form the black matrix 17 and the color filter layer 18 is reversed.

Figure 19:
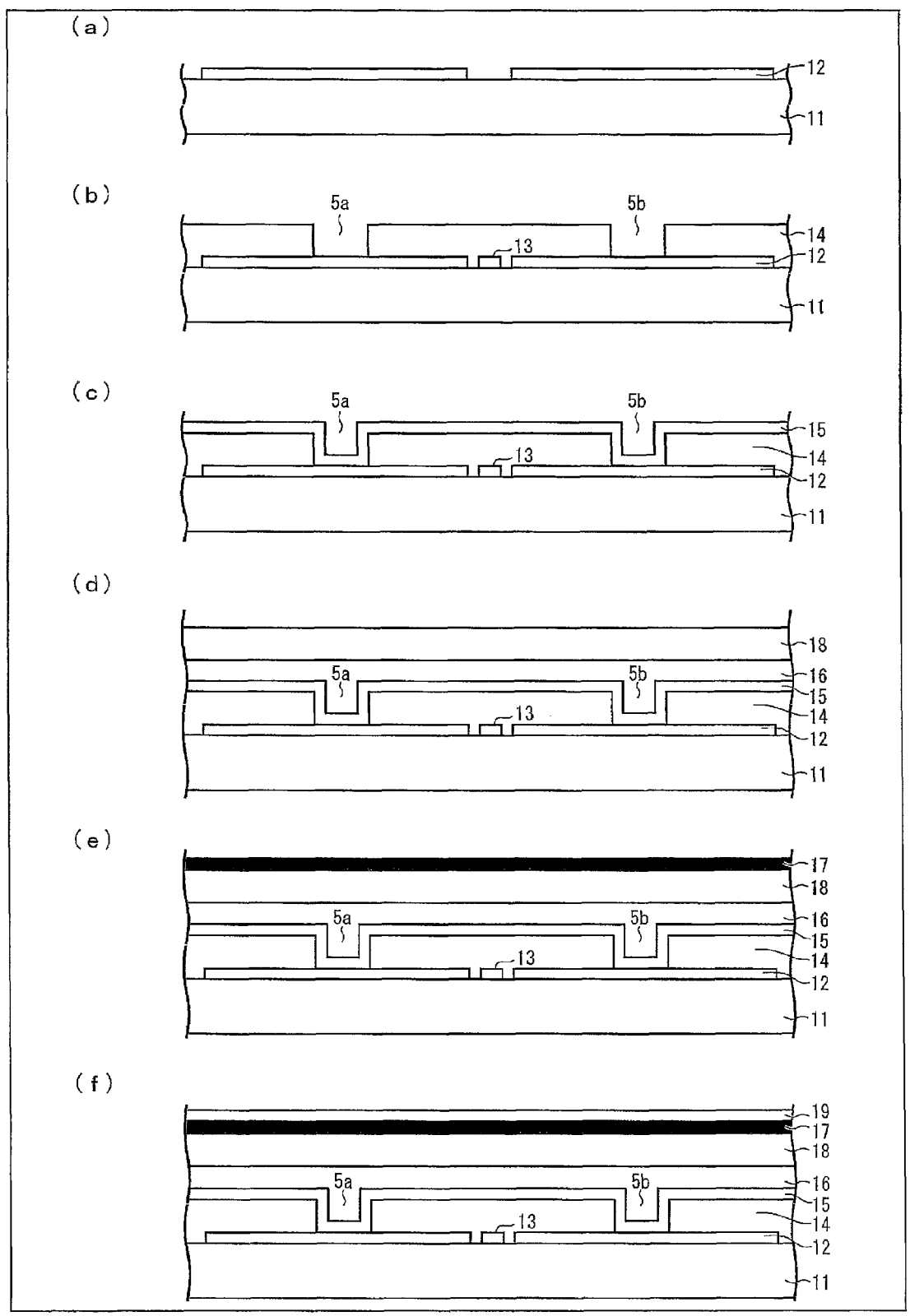
FIG. 19 is a set of views (a) through (f) showing steps of a process for fabricating the counter substrate in accordance with Example 3.

FIG. 19 is a set of views (a) through (f) showing steps of a process for fabricating the counter substrate 53 in accordance with the present example. The counter substrate 53 is configured such that the black matrix 17 is formed (as a film) on the color filter layer 18, and the counter electrode 19 is formed (as a film) on the black matrix 17 (see FIGS. 18 and 19).

As described above, the counter substrate 53 is configured such that the counter electrode 19 is formed (as a film) on the black matrix 17, so that the black matrix 17 and the counter electrode 19 are electrically connected to each other.

According to the above configuration, the present example can omit, in the production process, the step for electrically connecting the black matrix 17 and the counter electrode 19 to each other, that is, the step for forming contact holes 9 of the counter substrate 5 shown in (e) of FIG. 15. This makes it possible to simplify the process for producing the counter substrate 53 and reduce production costs.

Example 4

Figure 20:
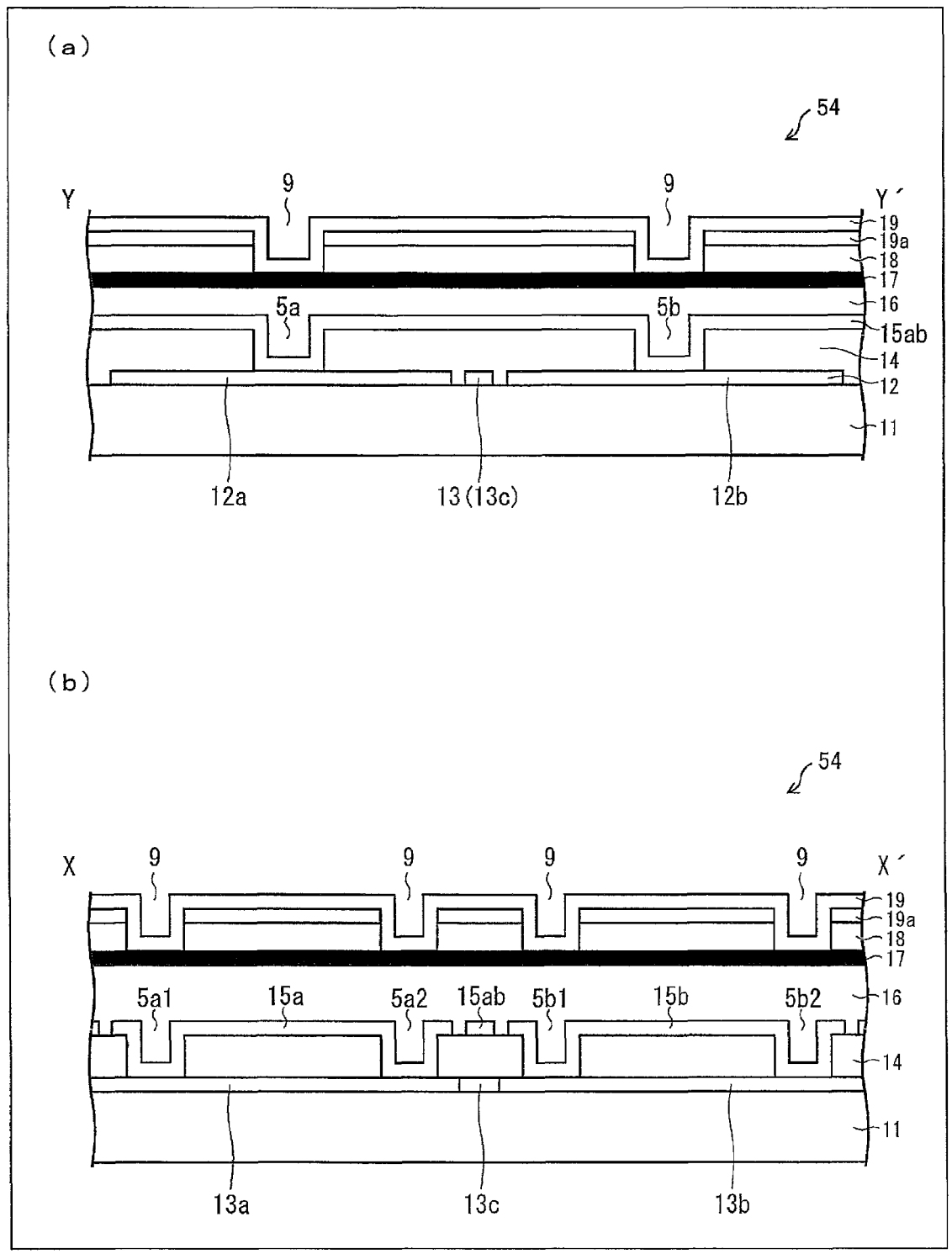
FIG. 20 is a set of cross-sectional views (a) and (b) showing a counter substrate in accordance with Example 4, (a) corresponding to the cross-sectional view taken along the line Y-Y' shown in FIG. 7, and (b) corresponding to the cross-sectional view taken along the line X-X' shown in FIG. 7.

FIG. 20 is a set of cross-sectional views (a) and (b) showing a counter substrate 54 in accordance with Example 4. Note that, (a) of FIG. 20 corresponds to the cross-sectional view taken along the line Y-Y' shown in FIG. 7, and (b) of FIG. 20 corresponds to the cross-sectional view taken along the line X-X' shown in FIG. 7.

The counter substrate 54 includes, on a glass substrate 11, first electrodes 12, second electrodes 13, a first insulating layer 14, metal wires 15, a second insulating layer 16, a black matrix (BM) 17, a color filter layer 18, a metal layer 19a, a counter electrode 19, and an alignment film (not illustrated), which are stacked in this order (see FIG. 20). That is, compared with the counter substrate 5 in accordance with Example 1, the counter substrate 54 in accordance with the present example further includes the metal layer 19a, and the metal layer 19a is electrically connected to the counter electrode 19.

Figure 21:
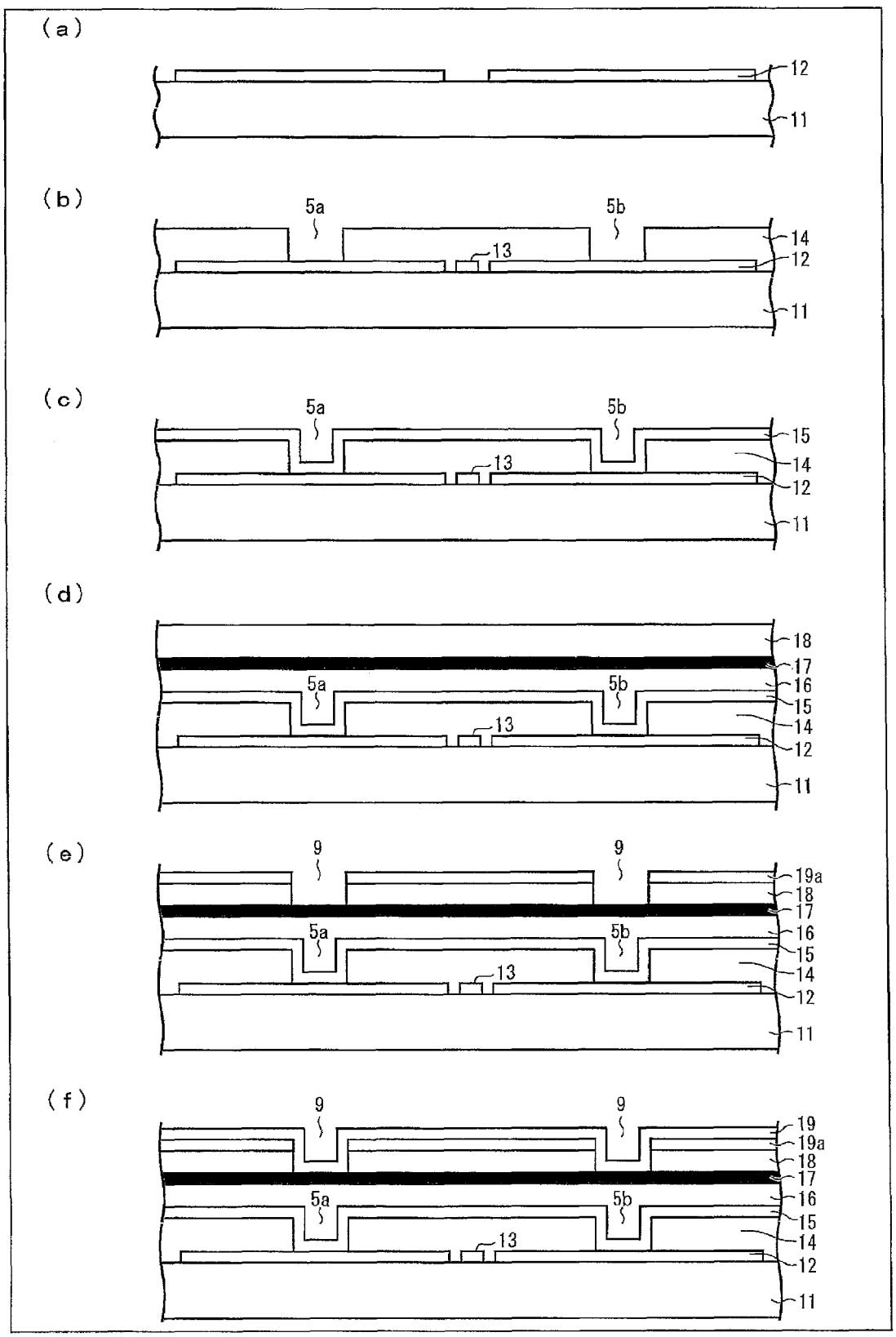
FIG. 21 is a set of views (a) through (f) showing steps of a process for fabricating the counter substrate in accordance with Example 4.

FIG. 21 is a set of views (a) through (f) showing steps of a process for fabricating the counter substrate 54 in accordance with the present example. The process for fabricating the counter substrate 54 is identical to the process for fabricating the counter substrate 5 in accordance with Example 1 until the step for forming contact holes 9 after forming the color filter layer 18 (see (e) of FIG. 15).

The counter substrate 54 is configured such that, after the contact holes 9 are formed, an electrically conductive transparent film is formed on the color filter layer 18, so that the metal layer 19a is formed (see (e) of FIG. 21). Next, an electrically conductive transparent film made of ITO, IZO, zinc oxide, tin oxide, etc. is formed on the metal layer 19a, so that the counter electrode 19 is formed (see (f) of FIG. 21).

According to the above configuration, the present example can thus further reduce resistance ($R_{CITO}$) of the counter electrode 19 compared with the configuration of Example 1 since the black matrix 17 made of an electrically conductive material and the metal layer 19a are electrically connected to the counter electrode 19. This allows a display panel 2 including the in-cell touch panel function to enhance position detection performance of a touch panel and to carry out a stable position detecting operation.

Example 5

Figure 37:
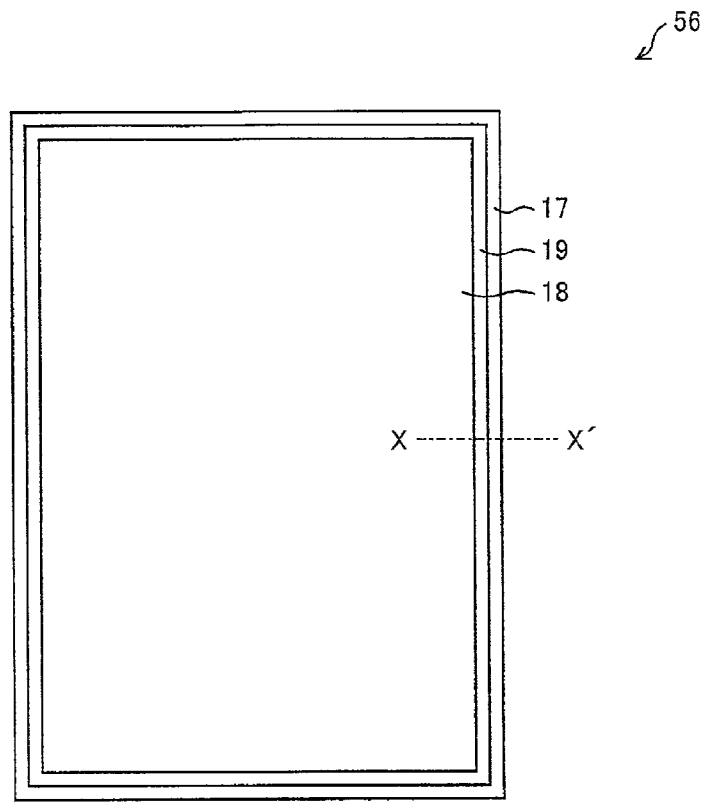
FIG. 37 is a plan view schematically showing a configuration of a display panel in accordance with Example 5.
Figure 38:
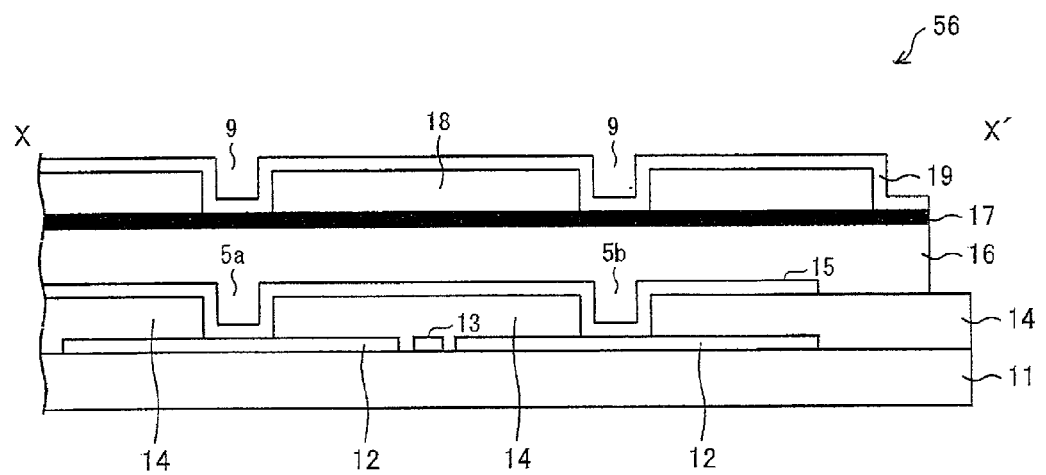
FIG. 38 is a cross-sectional view taken along the line X-X' shown in FIG. 37.

FIG. 37 is a plan view schematically showing a configuration of a counter substrate 56 in accordance with Example 5. FIG. 38 is a cross-sectional view taken along the line X-X' shown in FIG. 37.

The counter substrate 56, similar to the counter substrate 5 shown in Example 1, includes, on a glass substrate 11, first electrodes 12, second electrodes 13, a first insulating layer 14, metal wires 15, a second insulating layer 16, a black matrix (BM) 17, a color filter layer 18, a counter electrode 19, and an alignment film (not illustrated), which are stacked in this order (see FIG. 38).

The counter substrate 56 in accordance with the present example has both the configuration of Example 1 and the configuration of Example 2. Specifically, the counter substrate 56 is configured such that, in an inner region of a display panel 2, the black matrix 17 is electrically connected to the counter electrode 19 via contact holes 9, and at an outer peripheral edge of the display panel 2, the counter electrode 19 is formed (as a film) on the black matrix 17, so that the black matrix 17 and the counter electrode 19 are electrically connected to each other (see FIG. 38).

According to the counter substrate 56 in accordance with the present example, it is possible to reduce resistance in an entire region of the counter electrode 19.

Note that the counter substrate 56 can be fabricated by properly combining the steps for fabrication shown in Examples 1 and 2.

Example 6

Figure 34:
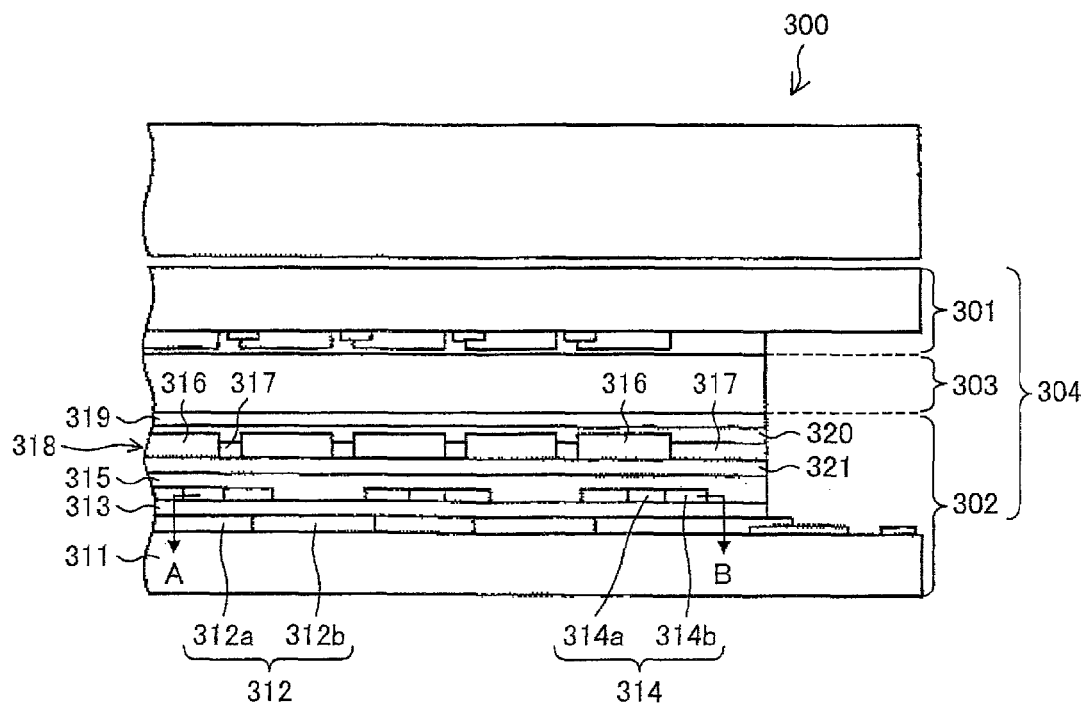
FIG. 34 is a cross-sectional view showing a configuration of a display device disclosed in Patent Literature 2.
Figure 35:
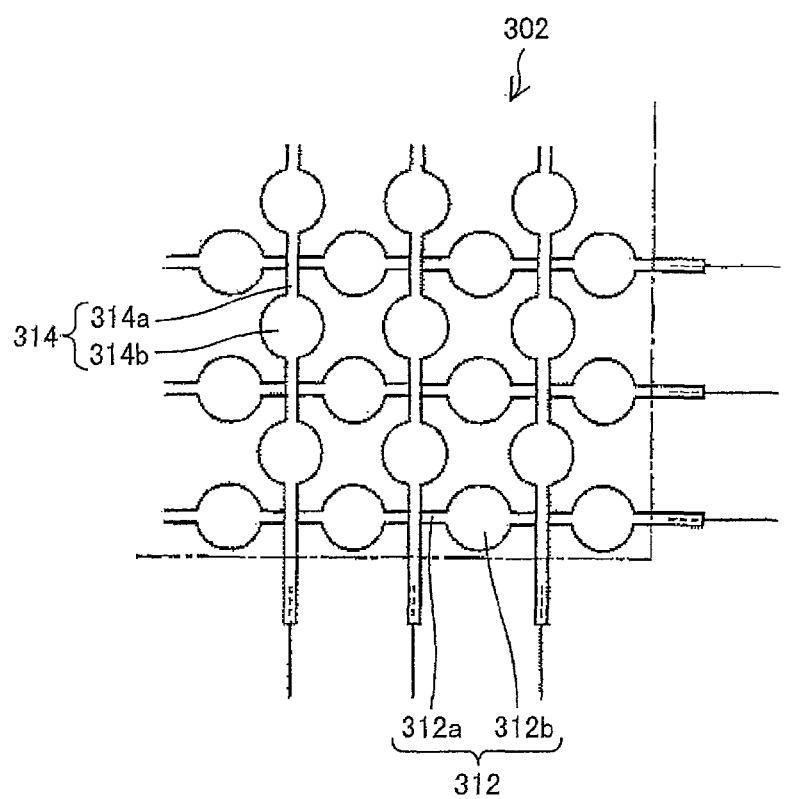
FIG. 35 is a plan view showing a configuration of a sensor electrode as taken along the line A-B shown in FIG. 34.
Figure 36:
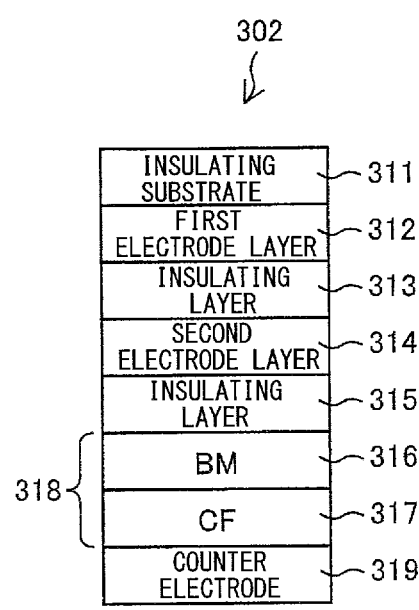
FIG. 36 is a cross-sectional view schematically showing a configuration of a main part of a CF substrate, which is used as a touch panel substrate to constitute an in-cell touch panel, of the display device disclosed in Patent Literatures 2 and 3, with the constituent layers stacked in the order shown.

In the above described Examples 1 through 5, the first electrodes 12 and the second electrodes 13 are formed on the same lamination level (or in the same plane), but the counter substrate in accordance with the present invention is not limited to this. It can be configured such that the first electrodes 12 and the second electrodes 13 are formed on the respective levels. According to a counter substrate 55 in accordance with the present example, first electrodes 12 and second electrodes 13 are formed on respective levels. That is, the first electrodes 12 and the second electrodes 13 can employ the conventional configuration shown in FIGS. 34 and 35.

Figure 22:
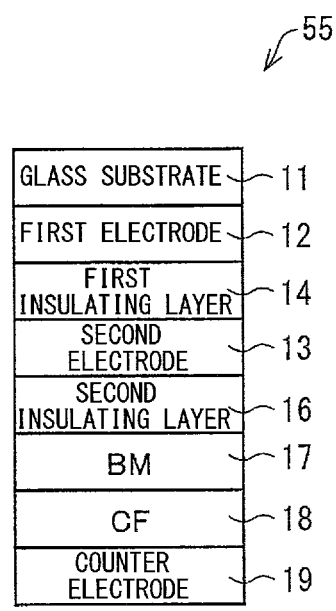
FIG. 22 is a cross-sectional view schematically showing a counter substrate in accordance with Example 6.
Figure 23:
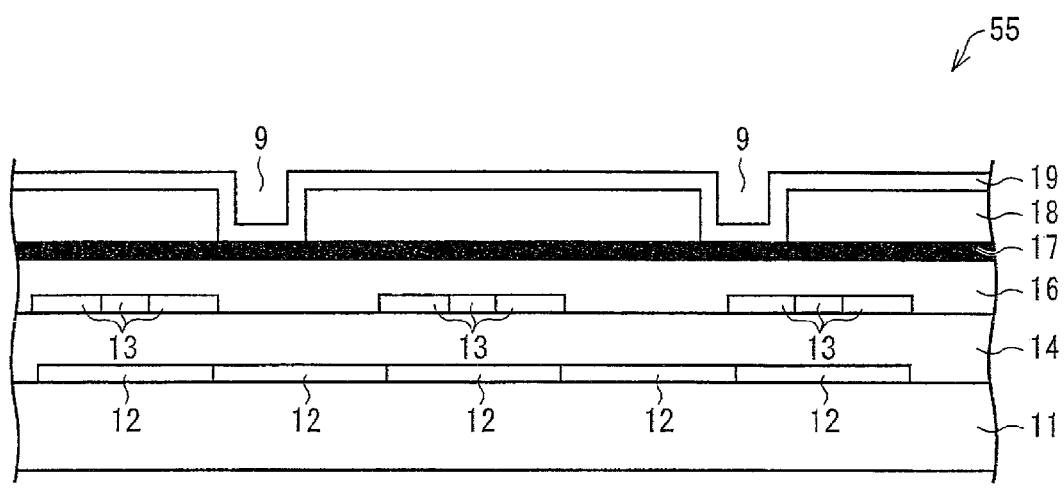
FIG. 23 is a cross-sectional view showing a specific configuration of the counter substrate shown in FIG. 22.

FIG. 22 is a cross-sectional view schematically showing the counter substrate 55 in accordance with Example 6. FIG. 23 is a cross-sectional view showing a specific configuration of the counter substrate 55.

The counter substrate 55 includes a glass substrate 11, the first electrodes 12, a first insulating layer 14, the second electrodes 13, a second insulating layer 16, a black matrix (BM) 17, a color filter layer 18, a counter electrode 19, and an alignment film (not illustrated), which are stacked in this order (see FIGS. 22 and 23). Further, the plurality of first electrodes 12 are electrically connected to each other and the plurality of second electrodes 13 are electrically connected to each other, and (i) either the first electrodes 12 or the second electrodes 13 serve as driving electrodes and (ii) the other electrodes serve as detecting electrodes. Further, the black matrix 17 is electrically connected to the counter electrode 19 via contact holes 9. Note that since the first electrodes 12 and the second electrodes 13 are provided on the respective levels, and the plurality of first electrodes 12 are electrically connected to each other and the plurality of second electrodes 13 are electrically connected to each other in the respective levels, the metal wires 15 in accordance with Example 1 etc. can be omitted.

According to the counter substrate 55 in accordance with the present example, by applying, to a conventional counter substrate, a simple configuration in which the black matrix 17 and the counter electrode 19 are electrically connected to each other, it is possible to reduce the resistance of the counter electrode 19.

Note that, needless to say, the configuration in which the first electrodes 12 and the second electrodes 13 are formed on the respective levels is applicable to the above examples.

(Exemplary Configuration 1 of Sealing Part)

Here, a configuration of a sealing part (outer peripheral edge) of the display panel 2 in accordance with the present invention is discussed. The configuration of the sealing part is applicable to a counter substrate in accordance with each of the above examples. The following description discusses with taking the counter substrate 56 of Example 5 (hereinafter referred to as a "counter substrate 5x") as an example. That is, the counter substrate 5x is configured such that, in an inner region of the display panel 2, the black matrix 17 is connected to the counter electrode 19 via the contact holes 9, and at the outer peripheral edge of the display panel 2, the black matrix 17 is formed on the counter electrode 19 so as to be electrically connected to the counter electrode 19.

Figure 24:
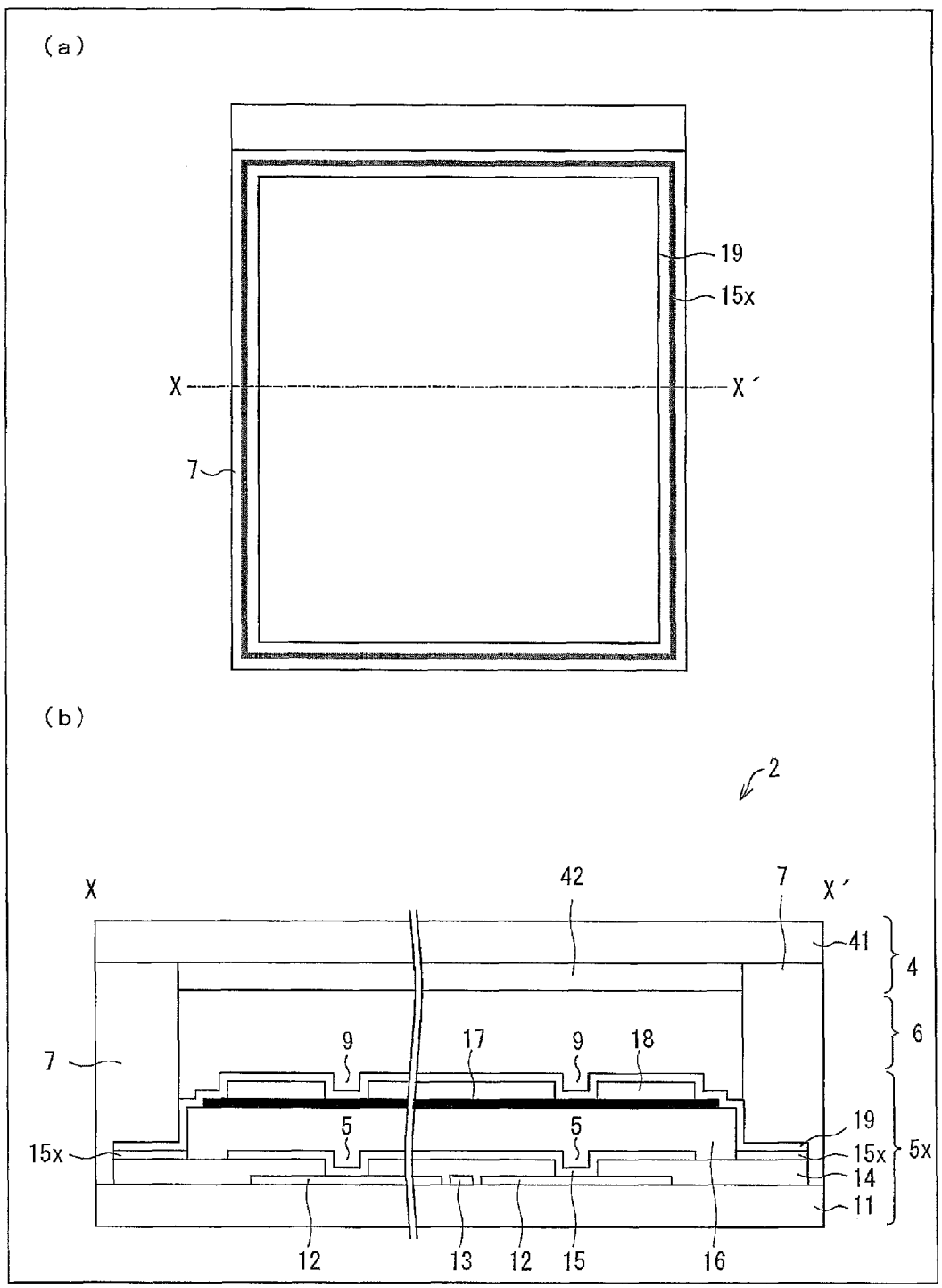
FIG. 24 is a set of diagrams (a) and (b), (a) being a plan view schematically showing an entire configuration of a display panel in accordance with Exemplary Configuration 1, and (b) being a cross-sectional view taken along the line X-X' shown in (a) of FIG. 24.

(a) of FIG. 24 is a plan view schematically showing an entire configuration of the display panel 2 in accordance with Exemplary Configuration 1, and (b) of FIG. 24 is a cross-sectional view taken along the line X-X' shown in (a) of FIG. 24.

The display panel 2 in accordance with Exemplary Configuration 1 includes an active-matrix substrate 4, the counter substrate 5x, a liquid crystal layer 6. The counter substrate 5x is constituted by the glass substrate 11, the first electrodes 12, the second electrodes 13, the first insulating layer 14, the metal wires 15, the second insulating layer 16, the black matrix (BM) 17, the color filter layer 18, the counter electrode 19 and the alignment film (not illustrated), which are stacked in this order. Further, in the counter substrate 5x, at the sealing part, the counter electrode 19 is electrically connected to metal wires 15x (shielded line). This makes it possible, also in the sealing part, to reduce the resistance of the counter electrode 19.

The active-matrix substrate 4 and the counter substrate 5x are configured to sandwich the liquid crystal layer 6 therebetween, and are combined together by a sealing member 7 formed on peripheries of the active-matrix substrate 4 and the counter substrate 5x. How to assemble the active-matrix substrate 4 and the counter substrate 5x is as described in the above discussed production method.

(Exemplary Configuration 2 of Sealing Part)

Figure 25:
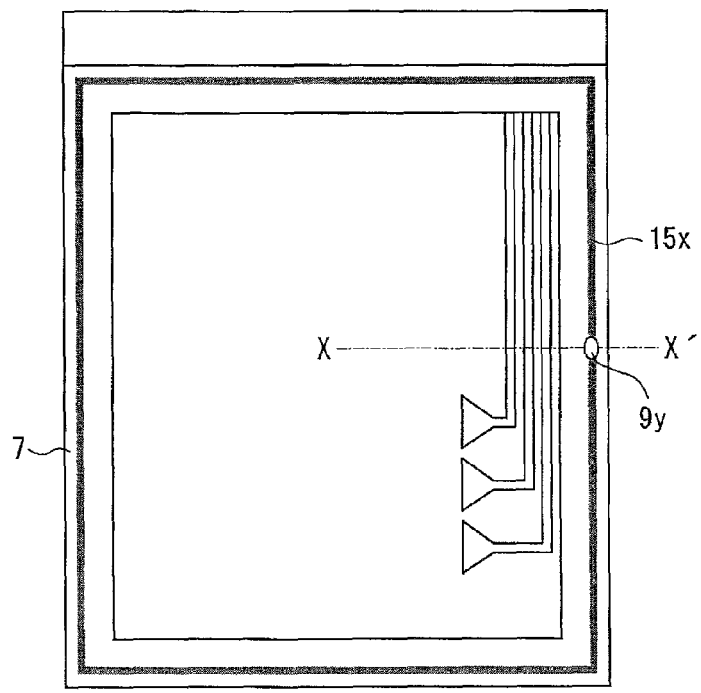
FIG. 25 is a set of diagrams (a) and (b), (a) being a plan view schematically showing an entire configuration of a display panel in accordance with Exemplary Configuration 2, and (b) being a cross-sectional view taken along the line X-X' shown in (a) of FIG. 25.
Figure 25:
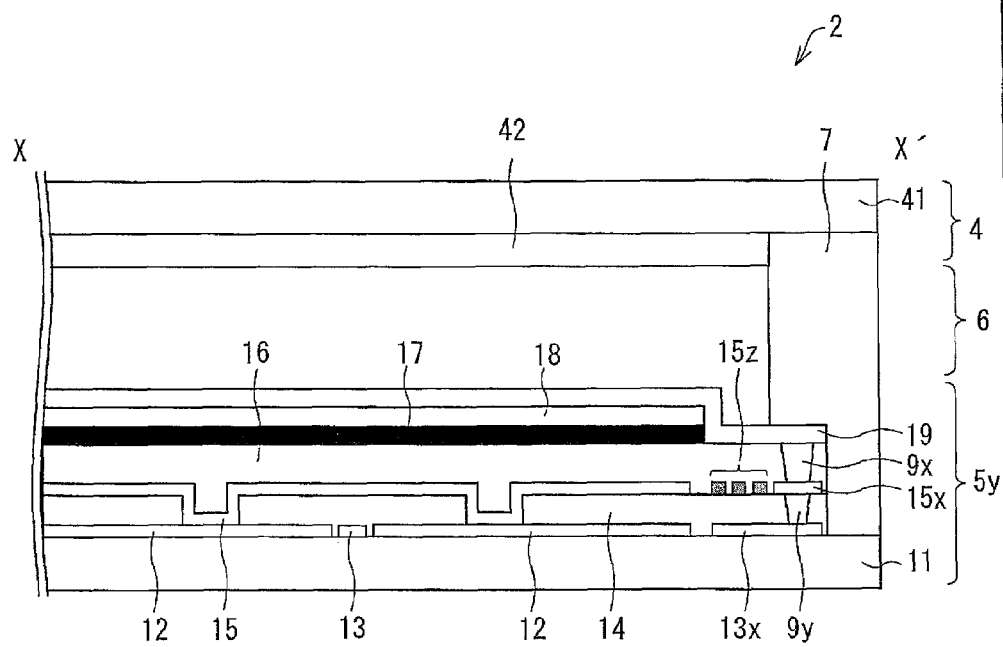

(a) of FIG. 25 is a plan view schematically showing an entire configuration of the display panel 2 in accordance with Exemplary Configuration 2, and (b) of FIG. 25 is a cross-sectional view taken along the line X-X' shown in (a) of FIG. 25.

The display panel 2 in accordance with the Configuration Example 2 includes the active-matrix substrate 4, a counter substrate 5y, the liquid crystal layer 6. The counter substrate 5y includes the glass substrate 11, the first electrodes 12, the second electrodes 13, a third electrode 13x (transparent electrode), the first insulating layer 14, the metal wires 15, a shield electrode 15x, signal wires 15z, the second insulating layer 16, the black matrix (BM) 17, the color filter layer 18, the counter electrode 19, and the alignment film (not illustrated), which are stacked in this order.

Further, the counter substrate 5y is configured such that, in the sealing part, the counter electrode 19 is electrically connected to the black matrix 17 and also electrically connected, via a contact hole 9x, to the shield electrode 15x, and the shield electrode 15x is electrically connected, via a contact hole 9y, to the third electrode 13x. This makes it possible, also in the sealing part, to reduce the resistance of the counter electrode 19, and to obtain a shielding effect by a fixed electric potential (counter voltage).

Figure 26:
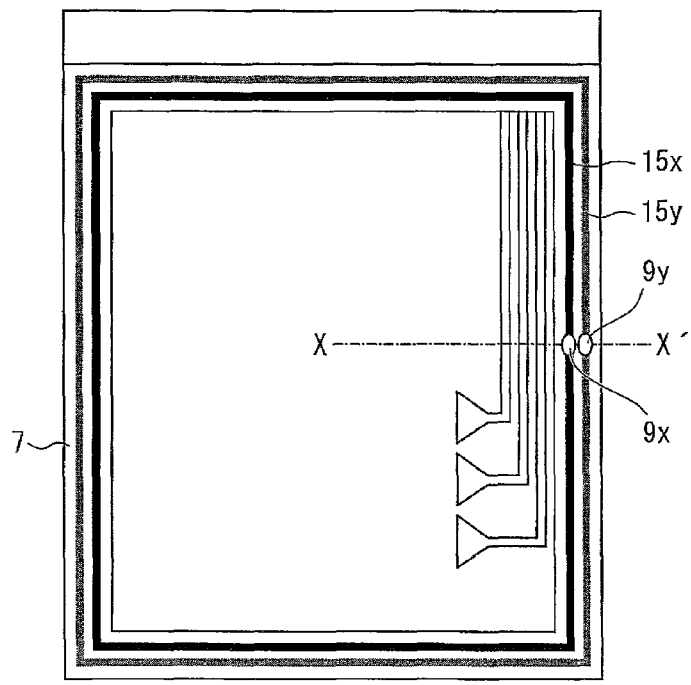
FIG. 26 is a set of diagrams (a) and (b), (a) being a plan view schematically showing an entire configuration of the display panel in accordance with a modification of FIG. 25, and (b) being a cross-sectional view taken along the line X-X' shown in (a) of FIG. 26.
Figure 26:
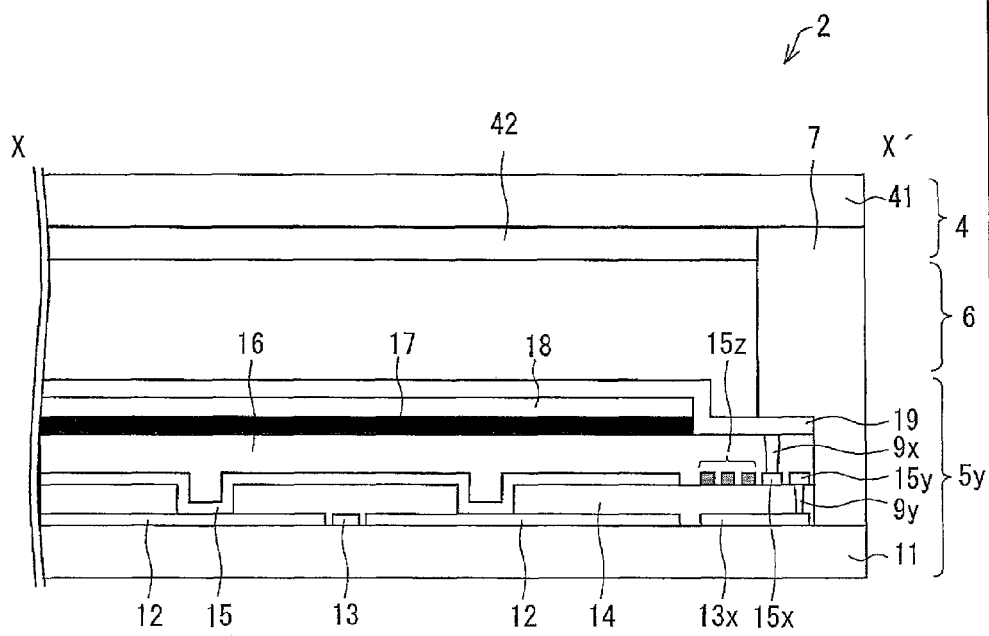

(a) of FIG. 26 is a plan view schematically showing an entire configuration of the display panel 2 in accordance with a modification of FIG. 25, and (b) of FIG. 26 is a cross-sectional view taken along the line X-X' shown in (a) of FIG. 26.

The display panel 2 of FIG. 26 is further provided with a shield electrode 15y. Note that the shield electrode 15y and the shield electrode 15x are electrically disconnected from each other. The counter substrate 5y of FIG. 26 is configured such that, in the sealing part, the counter electrode 19 is electrically connected to the black matrix 17, and also electrically connected to the shield electrode 15x via the contact hole 9x, and the shield electrode 15y is electrically connected to the third electrode 13x via the contact hole 9y. Further, the third electrode 13x is connected to a ground line (GND). This makes it possible, also in the sealing part, to reduce the resistance of the counter electrode 19, and to obtain a shielding effect by a fixed electric potential (counter voltage and GND electric potential).

(Exemplary Configuration 3 of Sealing Part)

Figure 27:
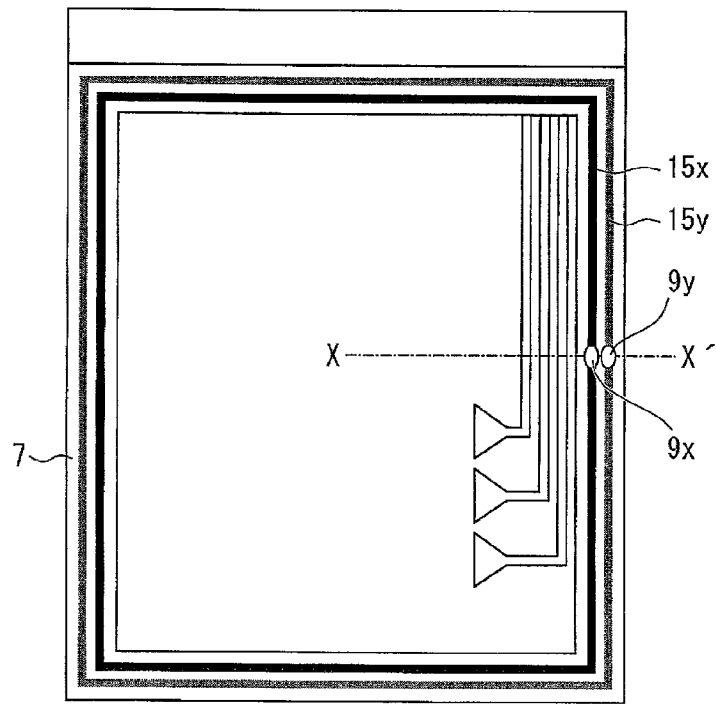
FIG. 27 is a set of diagrams (a) and (b), (a) being a plan view schematically showing an entire configuration of a display panel in accordance with Exemplary Configuration 3, and (b) being a cross-sectional view taken along the line X-X' shown in (a) of FIG. 27.
Figure 27:
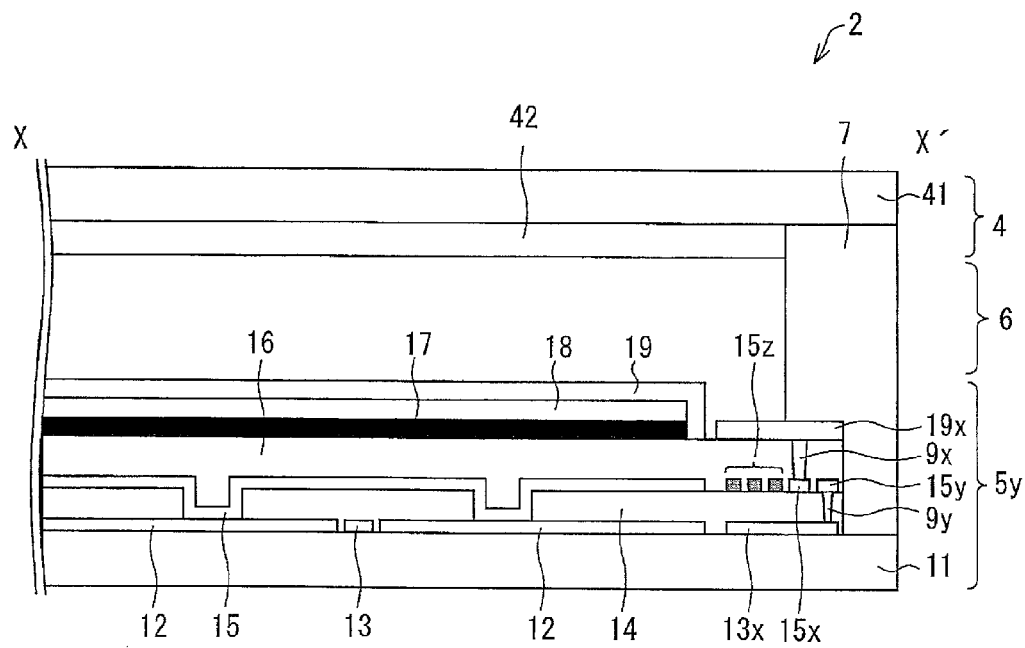

(a) of FIG. 27 is a plan view schematically showing an entire configuration of the display panel 2 in accordance with Exemplary Configuration 3, and (b) of FIG. 27 is a cross-sectional view taken along the line X-X' shown in (a) of FIG. 27.

The display panel 2 in accordance with Exemplary Configuration 3 is configured such that, in the display panel 2 in accordance with a modification of Exemplary Configuration 2 shown in FIG. 26, the counter electrode 19 is divided at the outer peripheral edge (sealing part). That is, a shield electrode 19x is further provided in the sealing part. The shield electrode 19x is electrically connected to the shield electrode 15x via the contact hole 9x, and the shield electrode 15y is electrically connected to the third electrode 13x via the contact hole 9y. Further, the third electrode 13x is connected to the ground line (GND).

According to the above configuration, since the counter electrode 19 is not connected to the ground line (GND), a shielding effect by a fixed electric potential (GDN electric potential) can be obtained.

(Terminal Areas in Frame Region)

Next, a configuration of terminal areas provided in a frame region of the display panel 2 in accordance with the present invention is discussed.

Figure 28:
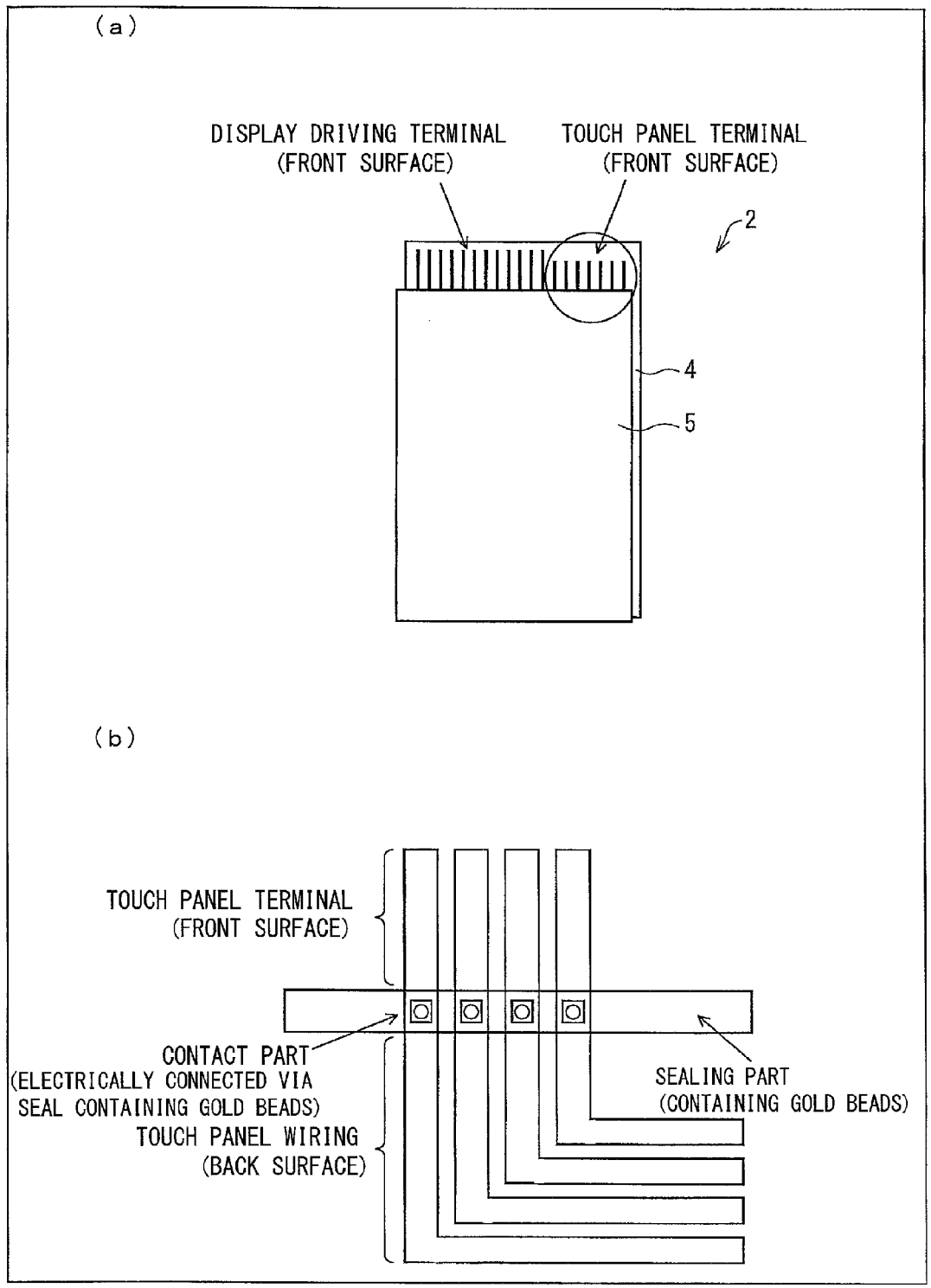
FIG. 28 is a set of diagrams (a) and (b), (a) being a plan view showing a display driving terminal and a touch panel terminal of the display panel in accordance with the present invention, (b) being an enlarged view of a portion corresponding to the touch panel terminal (encircled region) shown in (a) of FIG. 28.

(a) of FIG. 28 is a plan view showing a display driving terminal and a touch panel terminal of the liquid crystal panel 2. (b) of FIG. 28 is an enlarged view of a portion corresponding to the touch panel terminal (encircled region) shown in (a) of FIG. 28.

Figure 29:
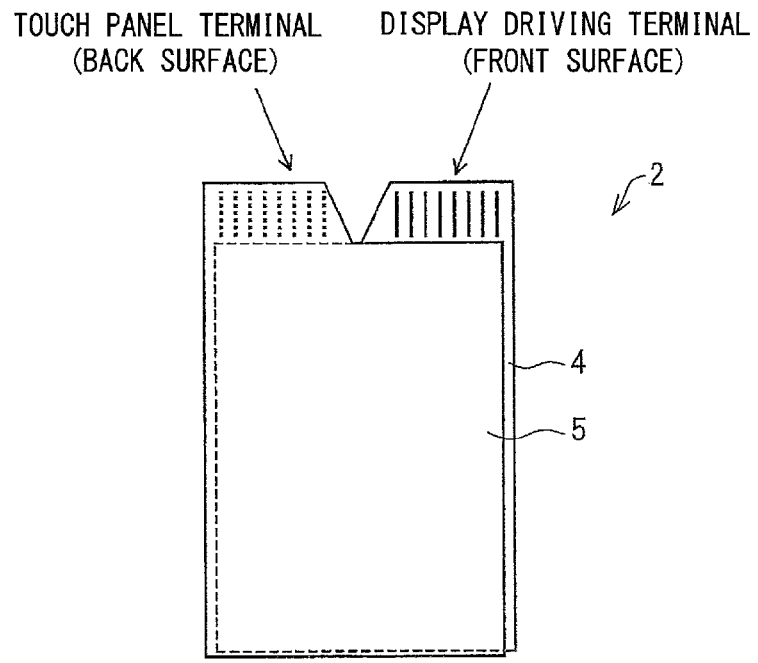
FIG. 29 is a plan view showing a modification of the display panel shown in FIG. 28.
Figure 30:
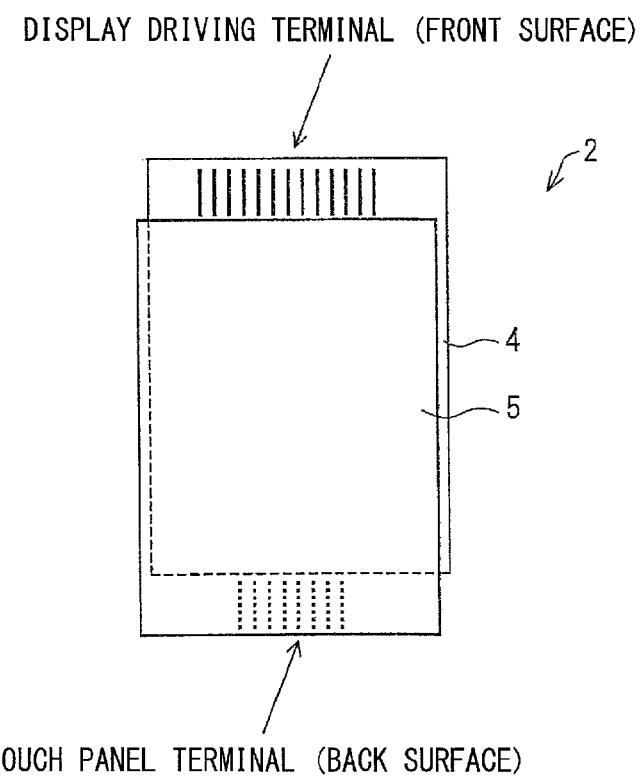
FIG. 30 is a plan view showing another modification of the display panel shown in FIG. 28.

Each of FIGS. 29 and 30 is another plan view showing a display driving terminal and a touch panel terminal of the liquid crystal panel 2.

As shown in (a) of FIG. 28, the liquid crystal panel 2 is arranged such that both a front surface of the display driving terminal and that of the touch panel terminal face in the same direction (vertically upward from the plane of paper of (a) of FIG. 28).

As shown in (b) of FIG. 28, the terminal provided on the front surface of the touch panel is connected, via contact parts, to a signal wire (touch panel wire) on a back surface. Specifically, the touch panel terminal and the signal wire on the back surface are electrically connected to each other at the contact parts via electrically conductive particles, such as gold beads, which are provided inside the sealing part.

This makes it possible to form a display driving terminal and a touch panel terminal so that they face in the same direction, thus making it possible to connect the display driving terminal and the touch panel terminal to circuits on the side of the active-matrix substrate 4 of the active-matrix substrate 4 and the counter substrate 5.

The terminal areas in the frame region of the liquid crystal panel 2 are, however, not limited to the above configuration, and may be arranged as shown, for example, in FIG. 29 or 30.

The liquid crystal panel 2 shown in FIG. 29 is configured such that (i) the respective terminal areas of the active-matrix substrate 4 and the counter substrate 5 are each partially cut off obliquely and placed so as not to overlap each other, so that the front surface of the touch panel terminal and that of the display driving terminal face each other.

The liquid crystal panel 2 shown in FIG. 30 is configured such that the active-matrix substrate 4 and the counter substrate 5 are drawn in opposite directions to be placed so as not to entirely overlap each other, so that the active-matrix substrate 4 and the counter substrate 5 have their respective terminal areas. The liquid crystal panel 2 shown in FIG. 30 is therefore configured such that the front surface of the touch panel terminal and that of the display driving terminal face each other and are symmetric with respect to the center of the liquid crystal panel 2. Note that, for the sake of convenience, in each of FIGS. 29 and 30, since the touch panel terminal is provided on the back surface of the counter substrate 5, the touch panel terminal is indicated by the dotted lines.

The above configuration of the terminal areas is commonly applicable to the counter substrate 5 of any of the above-described embodiments.

(Modification of Position Detecting Electrode)

Figure 31:
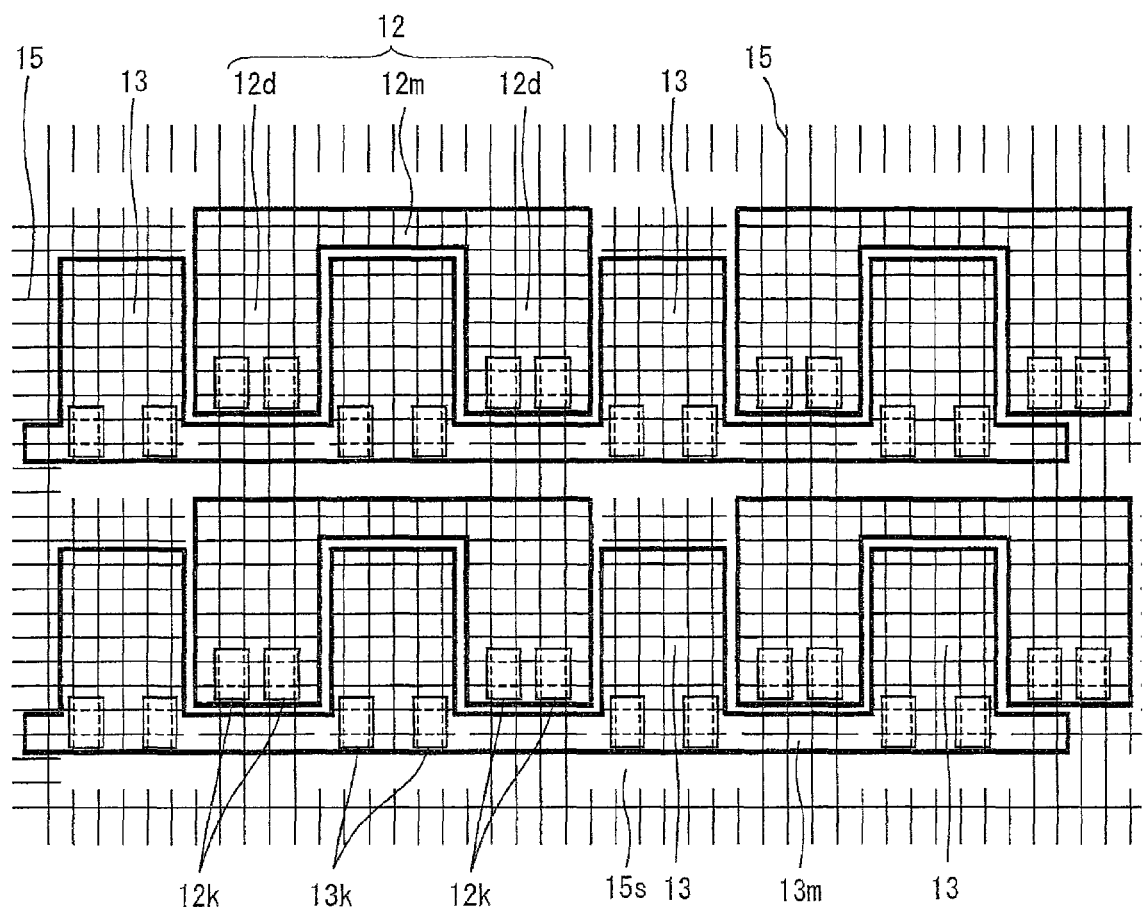
FIG. 31 is a plan view showing a modification of the first electrodes and the second electrodes shown in FIG. 6.

Here, a modification of the position detecting electrode (first electrodes 12 and second electrodes 13) shown in the above Examples 1 through 5 is discussed. FIG. 31 is a plan view showing a configuration of the position detecting electrode (first electrodes 12 and the second electrodes 13) in accordance with the present modification. According to the position detecting electrode shown in each of Examples 1 through 5, the first electrodes 12 and the second electrodes 13 are formed on the same lamination level, and the plurality of first electrodes 12 and the plurality of second electrodes 13 are successively arranged along an X direction and a Y direction, respectively, and the plurality of first electrodes 12 and the plurality of second electrodes 13 are alternately arranged along a first direction and a second direction, respectively (see FIG. 6). Further, the plurality of second electrodes 13 arranged along the X direction are electrically connected to each other via transparent relay electrodes 13c (connecting wires) which are formed on the same lamination level as the second electrodes 13.

The position detecting electrode in accordance with the present modification is, in contrast, arranged as shown in FIG. 31 such that the first electrodes 12 and the second electrodes 13 are each in a rectangular pattern (oblong shapes in the example shown in FIG. 31) in plan view and the first electrodes 12 and the second electrodes 13 are alternately arranged along the X direction and the Y direction, respectively.

The second electrodes 13 arranged along the X direction are connected to each other via connecting wires 13m provided along the X direction. In a case where the connecting wires 13 and the second electrodes 13 are made of the same material, the second electrodes 13 and the connecting wires 13m may be formed integrally on the same lamination level.

In the example shown in FIG. 31, the second electrodes 13 arranged along the X direction are connected to each other via the connecting wires 13m along the X direction. The second electrodes 13 arranged along the X direction are thus formed in a comb shape.

On the other hand, the first electrodes 12 arranged along the X direction each structured to include two rectangular electrode parts 12d adjacent to each other along the X direction. The electrode parts 12d are provided between the second electrodes 13, and the electrode parts 12d are connected to each other via a connection part 12m provided along the X direction.

As such, the first electrodes 12 are so formed in a depressed shape as to engage with the comb-shaped pattern of the second electrodes 13.

The first electrodes 12 are each electrically connected, via contact holes 12k provided in its electrode parts 12d, to the metal wires 15. The second electrodes 13 are each electrically connected, via contact holes 13k, to the metal wires 15.

The metal wires 15 have a disconnection in the space between each of the first electrodes 12 and the second electrodes 13 adjacent thereto, so that no electricity travels between each of the first electrodes 12 and the second electrodes 13.

As such, in FIG. 31, disconnecting lines 15s extending across the metal wires 15 are so provided as to surround each second electrode 13 in plan view.

This makes it possible to electrically connect the first electrodes 12 and the metal wires 15 to each other while preventing electricity from traveling between the first electrodes 12 and the second electrodes 13, thus making it possible to reduce the CR time constant.

Note, here, that the metal wires 15 are not necessarily in the form of a grid. That is, the metal wires need only bridge-connect at least either the first electrodes 12 or the second electrodes 13 to each other across a direction intersecting the direction along which the other electrodes are arranged.

Figure 32:
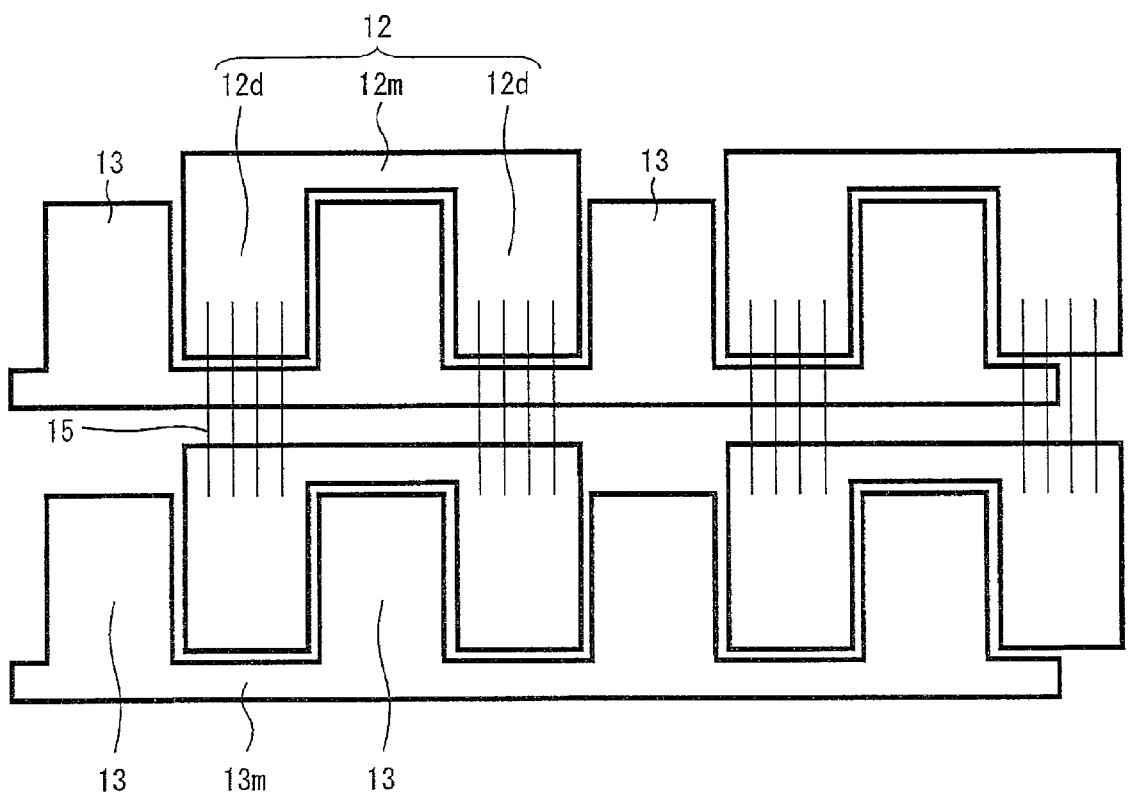
FIG. 32 is a plan view showing another modification of the first electrodes and the second electrodes shown in FIG. 6.
Figure 32:
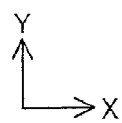
Figure 33:
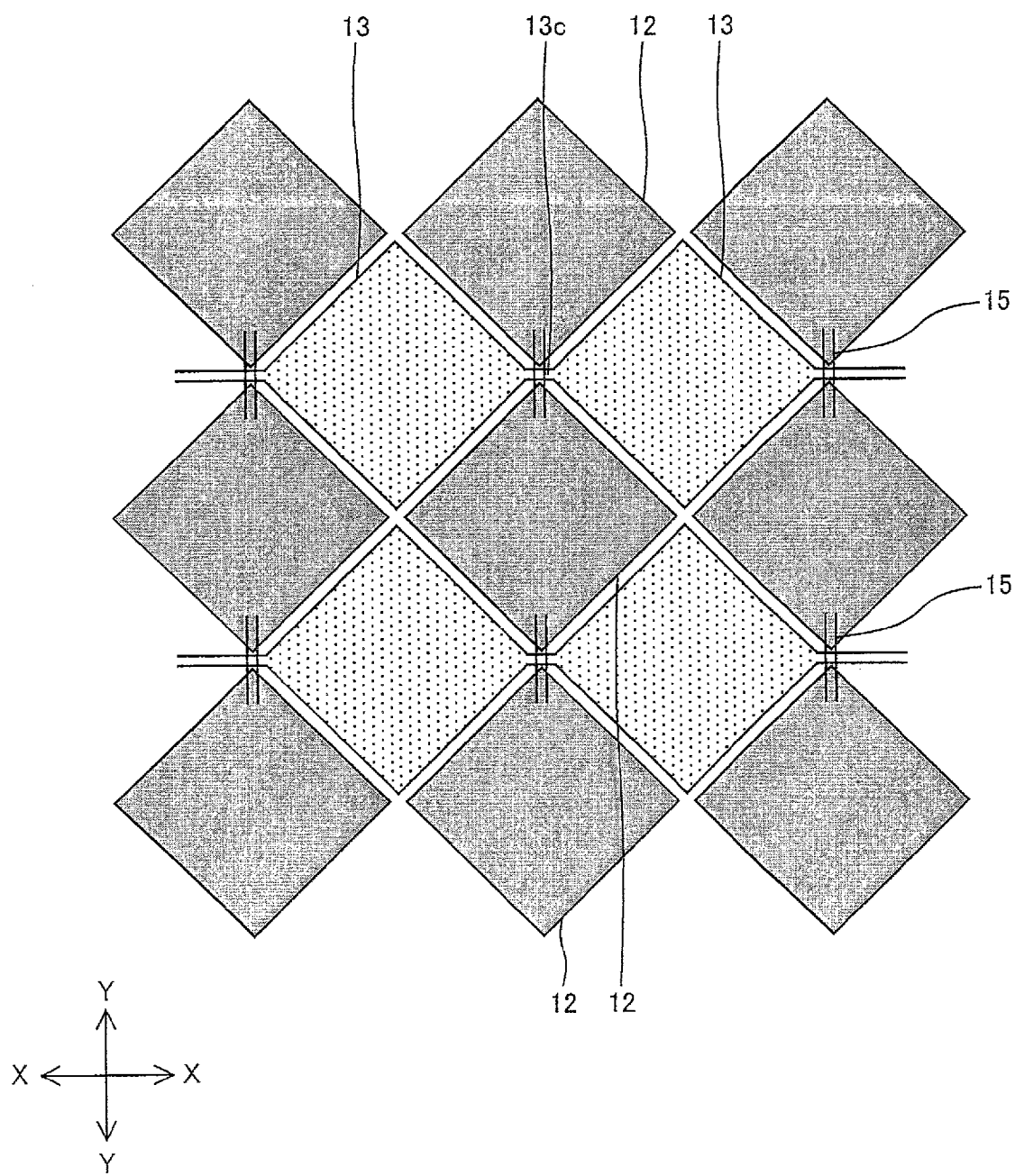
FIG. 33 is a plan view showing a modification of the metal wires shown in FIG. 8.

FIGS. 32 and 33 each illustrate an example in which (i) the metal wires 15 include linear wires (Y-wires) and (ii) the metal wires 15 are so provided across the first electrodes 12 arranged along the Y direction as to bridge-connect those first electrodes 12 to each other.

In this case, the first insulating layer 14 is not necessarily provided to entirely cover the first electrodes 12 and the second electrodes 13. That is, the first insulating layer 14 needs only to be provided between (i) the metal wires 15 and (ii) the first electrodes 12 and the second electrodes 13 and the connecting wires 13m (that is, in a region in plan view in which region the metal wires 15 are provided).

This allows the metal wires 15 to bridge-connect the first electrodes 12 to each other without electrically connecting to the second electrodes 13.

The touch panel substrate in accordance with an embodiment(s) of the present invention may also be configured such that the light blocking layer is provided on a lamination level different from a lamination level on which the counter electrode is provided, and the light blocking layer is electrically connected to the counter electrode via contact holes.

The touch panel substrate in accordance with an embodiment(s) of the present invention may also be configured such that the electrical connection between the light blocking layer and the counter electrode is made at an outer peripheral edge of the display panel.

According to the configuration, the counter electrode and the light blocking layer are connected to each other, so that a step for forming, for example, the contact holes is not required. This allows a simplification of a process for fabricating the touch panel substrate and therefore a reduction in process cost.

Further, according to the configuration, it is possible to connect, via the contact holes, the counter electrode and the light blocking layer in an inner region of the display panel, and directly connect the counter electrode and the light blocking layer at an outer peripheral edge of the display panel. This makes it possible to reduce resistance in an entire region of the counter electrode.

The touch panel substrate in accordance with an embodiment(s) of the present invention may also be configured such that the counter electrode is provided on the light blocking layer.

According to the configuration, the counter electrode and the light blocking layer are connected to each other, so that a step for forming, for example, the contact holes is not required. This allows a simplification of a process for fabricating the touch panel substrate and therefore a reduction in process cost.

A touch panel substrate in accordance with an embodiment(s) of the present invention preferably further includes a metal layer between the counter electrode and the light blocking layer, the metal layer being connected to the counter electrode.

According to the configuration, the counter electrode is connected not only to the light blocking layer, but also to the metal layer, so that it is possible to further reduce the resistance of the counter electrode. This can further enhance position detection performance of a touch panel.

The touch panel substrate in accordance with an embodiment(s) of the present invention may also be configured such that each of the position detecting electrodes includes a plurality of first electrodes and a plurality of second electrodes; and either the first electrodes or the second electrodes serve as driving electrodes, and the other electrodes serve as detecting electrodes.

According to the configuration, since either the first electrodes or the second electrodes serve as the driving electrodes, and the other of the first electrodes and the second electrodes serve as the detecting electrodes, it is possible to provide a capacitive touch panel.

The touch panel substrate in accordance with an embodiment(s) of the present invention is preferably configured such that each of the position detecting electrodes includes the plurality of first electrodes being arranged along a first direction and the plurality of second electrodes being arranged along a second direction perpendicular to the first direction and electrically insulated from the first electrodes; and the first electrodes and the second electrodes are formed on a same lamination level.

According to the configuration, it is possible to distance between (i) each of the first electrodes and second electrodes and (ii) the counter electrode as much as possible from each other by forming the plurality of first electrodes and the plurality of second electrodes on the same lamination level. Therefore, compared to a case where the first electrodes and the second electrodes are provided on respective levels, it is possible to reduce a parasitic capacitance between the position detecting electrodes and the counter electrode.

This can further enhance the position detection performance of the touch panel.

Further, according to the configuration, the first electrodes and the second electrodes can be formed of the same material at the same time. This allows a simplification of a process for fabricating the touch panel substrate and therefore a reduction in process cost.

Further, it is more preferable that the first electrodes and the second electrodes be formed in the same plane.

The touch panel substrate in accordance with an embodiment(s) of the present invention may also be configured such that the first electrodes and the second electrodes are transparent electrodes, the touch panel substrate further comprises: metal wires provided on a lamination level different from the lamination level on which the first electrodes and the second electrodes are provided; and transparent connecting wires provided on the lamination level on which the first electrodes and the second electrodes are provided, the metal wires make bridge connections between either the first electrodes or second electrodes in such a way as to bridge between the either first electrodes or second electrodes along the direction intersecting the direction along which the other electrodes are arranged, and the connection wires connect, in a plane in which the first electrodes and the second electrodes are formed, the other electrodes of the first and second electrodes.

According to the configuration, the metal wires make bridge connections between either the first electrodes or second electrodes in such a way as to bridge between the either first electrodes or second electrodes along the direction intersecting the direction along which the other electrodes are arranged. This allows the metal wires to connect either the first electrodes or the second electrodes with each other such that the first electrodes and the second electrodes are electrically insulated from each other.

Further, the first electrodes and the second electrodes are transparent electrodes, and, as described above, the metal wires make bridge connections between either the first electrodes or second electrodes. This makes it possible to reduce the resistance of the position detecting electrodes while ensuring optical transmittance and the amount of space that is covered by transparent regions. Therefore, mounting the touch panel substrate in the display panel makes it possible to reduce the resistance of the position detecting electrodes while ensuring the aperture ratio of the display panel.

Further, as described above, it is possible to reduce the resistance of the position detecting electrodes, so that the CR time constant can be reduced.

The touch panel substrate in accordance with an embodiment(s) of the present invention is preferably configured such that the metal wires are provided so as to overlap the light blocking layer when the touch panel substrate is seen in plan view.

According to the configuration, it is possible to reduce the resistance of the counter electrode while ensuring optical transmittance and the amount of space that is covered by transparent regions. Therefore, mounting the touch panel substrate in the display panel makes it possible to reduce the resistance of the counter electrode while ensuring the aperture ratio of the display panel.

The touch panel substrate in accordance with an embodiment(s) of the present invention is preferably configured such the metal wires are in a form of a grid According to the configuration, it is possible to reduce the resistance of the position detecting electrodes by the metal wires in the form of a grid, so that the CR time constant can further be reduced.

The touch panel substrate may also be configured such that the touch panel substrate further comprises an insulating layer between the metal wires and said either the first electrodes or second electrodes which are connected with each other via the metal wires, each of the metal wires makes the bridge connection via at least one contact hole formed in the insulating layer.

According to the configuration, the bridge connections can be easily made by the metal wires in the form of a grid. This allows a simplification of a process and therefore a reduction in process cost.

The touch panel substrate in accordance with an embodiment(s) of the present invention may also be configured such that the plurality of contact holes are provided respectively for each of said either the first electrodes or second electrodes.

According to the configuration, it is possible to ensure the area of connection parts between the metal wires and said either the first electrodes or second electrodes, and to reduce the resistances of the position detecting electrodes, so that the CR time constant can be reduced.

The touch panel substrate in accordance with an embodiment(s) of the present invention may also be configured such that, in the plane in which the first electrodes and the second electrodes are formed, either the first or second electrodes are connected via transparent connecting wires; the first electrodes and the second electrodes are each electrically connected to the metal wires via the contact holes; and the metal wires have disconnections between the contact holes provided for the first electrodes and contact holes provided for the second electrodes, so that no electricity travels from the first electrodes to the second electrodes or vice versa.

The touch panel substrate in accordance with an embodiment(s) of the present invention is preferably configured such that the metal wires have outer peripheral parts which serve as connecting parts with the other one of the pair of substrates and which are electrically disconnected from the first electrodes and the second electrodes, and the counter electrode is electrically connected to the outer peripheral parts of the metal wires.

According to the configuration, it is possible to further reduce the resistance of the counter electrode. Therefore, the CR time constant can be reduced.

A display panel in accordance with an embodiment(s) of the present invention includes: an electro-optic element; and a pair of substrates between which the electro-optic element is sandwiched, one of the pair of substrates being the touch panel substrate.

According to the configuration, using the touch panel substrate which is used as one of the pair of substrates makes it possible to provide display panel including an in-cell touch panel which is high in position detection performance and capable of carrying out a stable position detecting operation.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

A display touch panel including a touch panel function of the present invention is suitably applicable to various portable terminal devices.

REFERENCE SIGNS LIST

1 Display device
2 Display panel
3 Backlight
4 Active-matrix substrate
5, 52, 53, 54, 55, 56 Counter substrate (color filter (CF) substrate, touch panel substrate)
5a, 5b, 5a1, 5a2 Contact hole
6 Liquid crystal layer (electro-optic element)
9 Contact hole
11 Glass substrate
12, 12a, 12b First electrode
13, 13a, 13b Second electrode
13c Relay electrode 13c (connecting wire)
14 First insulating layer
15, 15a, 15b, 15ab Metal wire
16 Second insulating layer
17 Black matrix (BM) (light blocking layer)
18 Color filter layer (CF)
19 Counter electrode
19a Metal layer

The invention claimed is:

1. A touch panel substrate for use as one of a pair of substrates which constitute a display panel, the touch panel substrate comprising:
   position detecting electrodes that detect, based on a change in capacitance, a position of coordinates of a detection object, the position detecting electrodes include a plurality of first electrodes arranged along a first direction and a plurality of second electrodes arranged along a second direction perpendicular to the first direction and electrically insulated from the plurality of first electrodes, the plurality of first and second electrodes being on a same layer, and transparent electrodes; and
   a counter electrode placed to face pixel electrodes provided on the other substrate of the pair of substrates which constitute the display panel;
   a light blocking layer having a matrix pattern corresponding to pixels, the light blocking layer being made of an electrically conductive material and being electrically connected to the counter electrode;
   transparent connecting wires provided on the same layer as the position detecting electrodes, the connecting wires connect one of the first and second electrodes; and
   metal wires on a layer different from that of the position detecting electrodes, are in a form of a grid and the metal wires make bridge connections between the other of the first and second electrodes via a contact hole formed in an insulating layer between the metal wires and position detecting electrodes; wherein
   the metal wires have disconnections between an area overlapped with the first electrodes and another area overlapped with the second electrodes, so that no electricity travels from the first electrodes to the second electrodes or vice versa.

2. The touch panel substrate as set forth in claim 1, wherein the light blocking layer is provided on a lamination level different from a lamination level on which the counter electrode is provided, and the light blocking layer is electrically connected to the counter electrode via contact holes.

3. The touch panel substrate as set forth in claim 1, wherein the electrical connection between the light blocking layer and the counter electrode is made at an outer peripheral edge of the display panel.

4. The touch panel substrate as set forth in claim 1, wherein the counter electrode is provided on the light blocking layer.

5. A touch panel substrate as set forth in claim 2 further comprising a metal layer between the counter electrode and the light blocking layer, the metal layer being connected to the counter electrode.

6. The touch panel substrate as set forth in claim 1, wherein:
   each of the position detecting electrodes includes a plurality of first electrodes and a plurality of second electrodes; and
   either the first electrodes or the second electrodes serve as driving electrodes, and the other electrodes serve as detecting electrodes.

7. The touch panel substrate as set forth in claim 1, wherein the metal wires have outer peripheral parts which serve as connecting parts with the other one of the pair of substrates and which are electrically disconnected from the first electrodes and the second electrodes, and the counter electrode is electrically connected to the outer peripheral parts of the metal wires.

8. A display panel comprising:
an electro-optic element; and
a pair of substrates between which the electro-optic element is sandwiched, one of the pair of substrates being a touch panel substrate as set forth in claim 1.

9. A touch panel substrate for use as one of a pair of substrates which constitute a display panel, the touch panel substrate comprising:
position detecting electrodes that detect, based on a change in capacitance, a position of coordinates of a detection object, the position detecting electrodes includes a plurality of first electrodes being arranged along a first direction and a plurality of second electrodes being arranged along a second direction perpendicular to the first direction and electrically insulated from the plurality of first electrodes, the first and second electrodes are located on a same layer and transparent electrodes; and
transparent connecting wires provided on the same layer as the position detecting electrodes, the connecting wires connect one of the first and second electrodes; and
metal wires on a layer different from that of the position detecting electrodes, are in a form of a grid and the metal wires make bridge connections between the other of the first and second electrodes via a contact hole formed in an insulating layer between the metal wires and position detecting electrodes; wherein
the metal wires have disconnections between an area overlapped with the first electrodes and another area overlapped with the second electrodes, so that no electricity travels from the first electrodes to the second electrodes or vice versa.

10. The touch panel substrate as set forth in claim 9, wherein:
each of the position detecting electrodes includes a plurality of first electrodes and a plurality of second electrodes; and
either the first electrodes or the second electrodes serve as driving electrodes, and the other electrodes serve as detecting electrodes.

11. The touch panel substrate as set forth in claim 9, wherein a plurality of contact holes are provided, respectively, for each of the plurality of first electrodes or for each of the plurality of second electrodes.

12. A display panel comprising:
an electro-optic element; and
a pair of substrates between which the electro-optic element is sandwiched, one of the pair of substrates being a touch panel substrate as set forth in claim 9.

* * * * *